(12) United States Patent
Oshikiri

(10) Patent No.: US 7,844,451 B2
(45) Date of Patent: Nov. 30, 2010

(54) SPECTRUM CODING/DECODING APPARATUS AND METHOD FOR REDUCING DISTORTION OF TWO BAND SPECTRUMS

(75) Inventor: Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 10/571,761

(22) PCT Filed: Sep. 15, 2004

(86) PCT No.: PCT/JP2004/013455

§ 371 (c)(1),
(2), (4) Date: Apr. 7, 2006

(87) PCT Pub. No.: WO2005/027095

PCT Pub. Date: Mar. 24, 2005

(65) Prior Publication Data

US 2006/0251178 A1 Nov. 9, 2006

(30) Foreign Application Priority Data

Sep. 16, 2003 (JP) .............................. 2003-323658

(51) Int. Cl.
*G10L 19/12* (2006.01)
(52) U.S. Cl. ...................... 704/219; 704/223
(58) Field of Classification Search ................ 704/219, 704/207, 223
See application file for complete search history.

(56) References Cited

U.S. PATENT DOCUMENTS

| | | | | |
|---|---|---|---|---|
| 4,479,226 A | * | 10/1984 | Prabhu et al. ................. 380/34 |
| 5,546,381 A | * | 8/1996 | Fukushima ................. 370/479 |
| 5,561,463 A | * | 10/1996 | Thomas et al. ........... 348/392.1 |
| 5,581,652 A | * | 12/1996 | Abe et al. ................... 704/222 |
| 5,752,222 A | | 5/1998 | Nishiguchi et al. |
| 5,752,225 A | * | 5/1998 | Fielder ....................... 704/229 |
| 6,064,698 A | * | 5/2000 | Koike ......................... 375/242 |
| 6,865,534 B1 | | 3/2005 | Murashima et al. |
| 7,272,555 B2 | * | 9/2007 | Lee et al. .................... 704/219 |

(Continued)

FOREIGN PATENT DOCUMENTS

JP     8263096    10/1996

(Continued)

OTHER PUBLICATIONS

PCT International Search Report dated Sep. 16, 2003.

(Continued)

*Primary Examiner*—Michael N Opsasnick
(74) *Attorney, Agent, or Firm*—Dickinson Wright PLLC

(57) ABSTRACT

A coding apparatus capable of coding a spectrum at a low bit rate and with high quality without producing any disturbance in a harmonic structure of the spectrum. In this apparatus, internal state setting section (106) sets an internal state of filtering section (107) using first spectrum S1($k$). Pitch coefficient setting section (109) outputs pitch coefficient T by gradually changing it. Filtering section (107) calculates estimated value S'2($k$) of second spectrum S2($k$) based on pitch coefficient T. Search section (108) calculates the degree of similarity between S2($k$) and S'2($k$). At this time, pitch coefficient T' corresponding to the maximum calculated degree of similarity is given to filter coefficient calculation section (110). Filter coefficient calculation section (110) determines filter coefficient $\beta_i$ using this pitch coefficient T'.

25 Claims, 19 Drawing Sheets

U.S. PATENT DOCUMENTS

2003/0093271 A1     5/2003    Tsushima
2004/0028244 A1     2/2004    Tsushima

FOREIGN PATENT DOCUMENTS

| | | |
|---|---|---|
| JP | 9 127996 | 5/1997 |
| JP | 3283413 | 6/1997 |
| JP | 10285046 | 10/1998 |
| JP | 2000 3193 | 1/2000 |
| WO | 03/007480 | 1/2003 |

OTHER PUBLICATIONS

Y. Asakawa, et al.; 3-4-11 "A 24-kbit/s Wideband Speech Coding Method," The Acoustical Society of Japan 1996 Autumn, pp. 281-282 with partial English translation.

M. Oshikiri, et al., "Efficient Spectrum Coding For Super-Wideband Speech And Its Application To 7/10/15 KHZ Bandwidth Scalable Coders" Acoustics, Speech, and Signal Processing, 2004, Proceedings (ICASSP '04), IEEE International Conference on Montreal, Quebec, Canada, vol. 1, May 17, 2004, pp. 481-484.

M. Oshikiri, H. Ehara, K Yoshida, "A Scalable Coder Designed for 10-kHz Bandwidth Speech," IEEE Speech Coding Workshop Proceedings, Oct. 2002, pp. 111-113.

\* cited by examiner

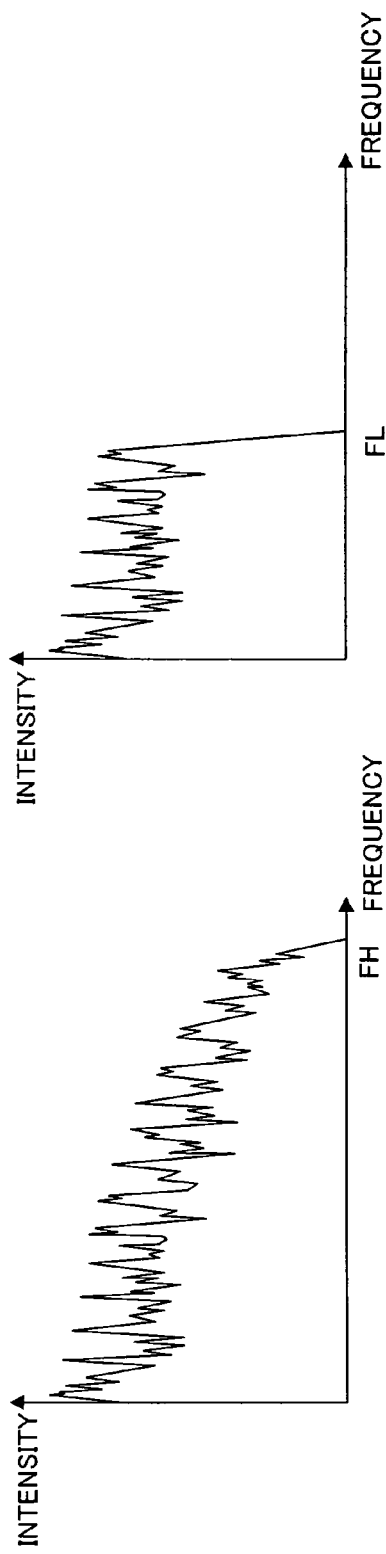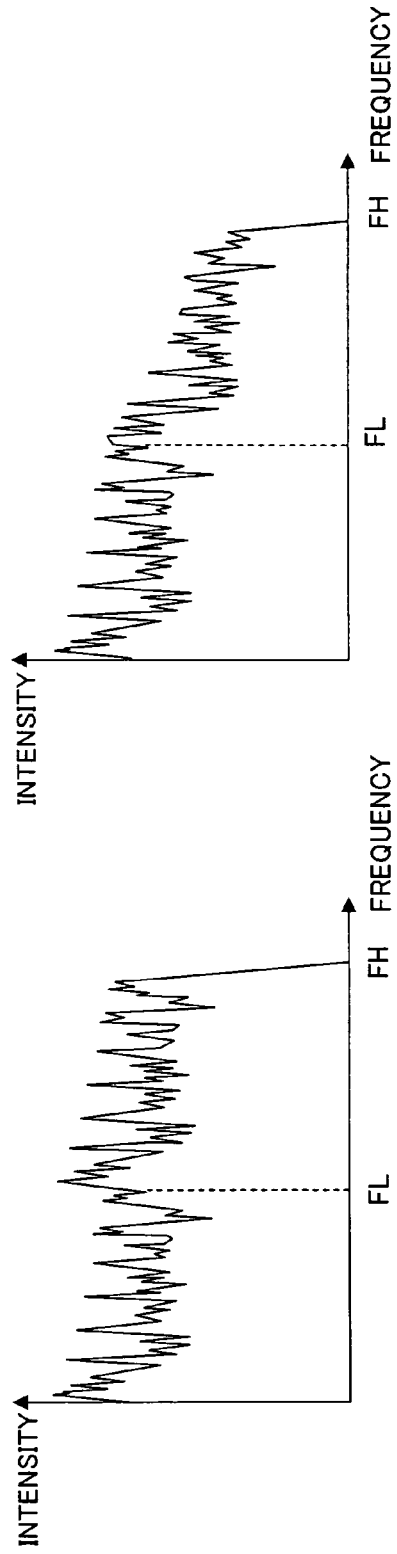

SPECTRUM CODING/DECODING APPARATUS AND METHOD FOR REDUCING DISTORTION OF TWO BAND SPECTRUMS

TECHNICAL FIELD

The present invention relates to a coding apparatus mounted on a radio communication apparatus or the like for coding a voice signal, audio signal or the like and a decoding apparatus for decoding this coded signal.

BACKGROUND ART

A coding technology for compressing a voice signal, audio signal or the like to a low bit rate signal is particularly important from the standpoint of effectively using a transmission path capacity (channel capacity) of radio waves or the like and a recording medium in a mobile communication system.

Examples of a voice coding scheme for coding a voice signal include schemes like G726, G729 standardized by the ITU-T (International Telecommunication Union Telecommunication Standardization Sector). These schemes use narrow band signals (300 Hz to 3.4 kHz) as coding targets and can perform high quality coding at bit rates of 8 kbits/s to 32 kbits/s. However, since such a narrow band signal is so narrow that its frequency band is a maximum of 3.4 kHz, the quality thereof is such that it gives the user an impression that a sound is muffled, which results in a problem that it lacks a sense of realism.

Furthermore, there is also a voice coding scheme that uses wideband signals (50 Hz to 7 kHz) as coding targets. Typical examples of this are G722, G722.1 of ITU-T and AMR-WB of 3GPP (The 3rd Generation Partnership Project). These schemes can perform coding of wideband voice signals at a bit rate of 6.6 kbits/s to 64 kbits/s. However, when the signal to be coded is voice, although a wideband signal has relatively high quality, it is not sufficient when an audio signal is the target or a voice signal of higher quality with a sense of realism is required.

On the other hand, when a maximum frequency of a signal is generally on the order of 10 to 15 kHz, it is possible to obtain a sense of realism equivalent to FM radio, and when the maximum frequency is on the order of up to 20 kHz, it is possible to obtain quality comparable to that of CD (compact disk). For such a signal, audio coding represented by the layer III scheme or AAC scheme standardized by MPEG (Moving Picture Expert Group) is appropriate. However, these audio coding schemes have a wide frequency band of a signal to be coded, which results in a problem that the bit rate of a coded signal increases.

Examples of conventional coding technologies include a technology of coding a signal with a wide frequency band at a low bit rate (e.g., see Patent Document 1). According to this, an input signal is divided into a signal of a low-frequency domain and a signal of a high-frequency domain, the spectrum of the signal of the high-frequency domain is replaced by the spectrum of the signal of the low-frequency domain and coded, and the overall bit rate is thereby reduced.

FIG. 1A to FIG. 1D show an overview of the above described processing of replacing the spectrum of high-frequency domain by the spectrum of the low-frequency domain. This processing is originally intended to be performed in combination with coding processing, but for simplicity of explanation, a case where the above described processing is performed on an original signal will be explained as an example.

FIG. 1A shows a spectrum of an original signal whose frequency band is restricted to $0 \leq k < FH$, FIG. 1B shows a spectrum of the signal restricted to $0 \leq k < FL$ (where, $FL < FH$), FIG. 1C shows a spectrum obtained by replacing a high-frequency domain (high-frequency band) by a low-frequency domain (low-frequency band) using the above described technology and FIG. 1D shows a spectrum obtained by shaping the replacing spectrum according to spectrum envelope information about the replaced spectrum. In these figures, the horizontal axis shows a frequency and the vertical axis shows intensity of a spectrum.

In this technology, a spectrum of the original signal whose frequency band is $0 \leq k < FH$ (FIG. 1A) is expressed using a low-frequency spectrum whose frequency band is $0 \leq k < FL$ (FIG. 1B). More specifically, the high-frequency spectrum ($FL \leq k < FH$) is replaced by the low-frequency spectrum ($0 \leq k < FL$). As a result of this processing, the spectrum as shown in FIG. 1C is obtained. Here, for simplicity of explanations, a case with a relationship of $FL=FH/2$ will be explained as an example. According to information about a spectrum envelope of the original signal, the amplitude value of the spectrum in the high-frequency domain of the spectrum in FIG. 1C is adjusted and the spectrum as shown in FIG. 1D is obtained. This is the spectrum which is the spectrum obtained by estimating the original signal.

Patent Document 1: National Publication of International Patent Application No. 2001-521648 (pp. 15, FIG. 1, FIG. 2)

DISCLOSURE OF INVENTION

Problems to be Solved by the Invention

Generally, spectra such as voice signal and audio signal are known to have a harmonic structure in which a peak of spectrum appears at every integer multiple of a certain frequency (every predetermined pitch). This harmonic structure is important information to keep the quality of a voice signal, audio signal or the like, and if disturbance occurs in the harmonic structure, a listener perceives deterioration of the quality.

FIGS. 2A and 2B are diagrams illustrating problems of the conventional technology.

FIG. 2A is a spectrum obtained by analyzing the spectrum of an audio signal. As is appreciated from this figure, the original signal has a harmonic structure having an interval T on the frequency axis. On the other hand, FIG. 2B shows a spectrum obtained as a result of estimating the spectrum of the original signal according to the above described technology. When these two spectra are compared, it is observed from the spectrum shown in FIG. 2B that the harmonic structure is maintained in low-frequency spectrum S1 of the replacement source and high-frequency spectrum S2 of the replacement destination, whereas the harmonic structure is collapsed in the connection-domain (spectrum S3) between low-frequency spectrum S1 and high-frequency spectrum S2.

When this estimated spectrum is converted to a time signal and listened, there is a problem that the listener perceives deterioration in quality due to such disturbance of the harmonic structure. This disturbance of the harmonic structure is caused by the fact that replacement has been performed with no consideration given to the shape of the harmonic structure.

It is an object of the present invention to provide a coding apparatus capable of coding a spectrum at a low bit rate and with high quality without producing disturbance in the harmonic structure of the spectrum and a decoding apparatus capable of decoding this coded signal.

Means for Solving the Problem

The coding apparatus of the present invention adopts a configuration comprising an acquisition section that acquires a spectrum divided into two bands of low-frequency band and high-frequency band, a calculation section that calculates a parameter indicating the degree of similarity between the acquired spectrum of the low-frequency band and the acquired spectrum of the high-frequency band based on the harmonic structure of the spectrum and a coding section that encodes the calculated parameter indicating the degree of similarity instead of the acquired spectrum of the high-frequency band.

The decoding apparatus of the present invention adopts a configuration comprising a spectrum acquisition section that acquires the spectrum of the low-frequency band out of the spectrum divided into two bands of low-frequency band and high-frequency band, a parameter acquisition section that acquires a parameter indicating the degree of similarity between the spectrum of the low-frequency band and the spectrum of the high-frequency band and a decoding section that decodes the spectra of the low-frequency band and high-frequency band using the acquired spectrum of the low-frequency band and the parameter.

The coding method of the present invention comprises an acquiring step of acquiring a spectrum divided into two bands of low-frequency band and high-frequency band, a calculating step of calculating a parameter indicating the degree of similarity between the acquired spectrum of the low-frequency band and the acquired spectrum of the high-frequency band based on a harmonic structure of the spectrum and a coding step of coding the calculated parameter indicating the degree of similarity instead of the acquired spectrum of the high-frequency band.

The decoding method of the present invention comprises a spectrum acquiring step of acquiring a spectrum of a low-frequency band out of a spectrum divided into two bands of the low-frequency band and high-frequency band, a parameter acquiring step of acquiring a parameter indicating the degree of similarity between the spectrum of the low-frequency band and the spectrum of the high-frequency band and a decoding step of decoding the spectra of the low-frequency band and high-frequency band using the acquired spectrum of the low-frequency band and the parameter.

Advantageous Effect of the Invention

The present invention is capable of performing coding of a spectrum at a low bit rate and with high quality without any collapse of a harmonic structure of the spectrum. Furthermore, the present invention is also capable of improving sound quality when decoding this coded signal.

BRIEF DESCRIPTION OF DRAWINGS

FIG. 1 is a diagram illustrating an overview of a conventional processing of replacing a spectrum of high-frequency domain by a spectrum of a low-frequency domain;

BEST MODE FOR CARRYING OUT THE INVENTION

The inventor focused attention on the characteristics such as voice signal, audio signal or the suchlike (hereinafter, collectively referred to as "acoustic signal"), that is to say, on the fact that an acoustic signal forms a harmonic structure in the frequency axis direction, discovered the possibility of performing coding spectra of the remaining bands using spectra of some bands out of spectra of all frequency bands, and came up with the present invention.

That is, the essence of the present invention is to determine, for example, when coding a signal spectrum divided into two frequency bands of high-frequency domain and low-frequency domain, the degree of similarity between the spectra of both the high-frequency domain and low-frequency domain for the spectrum of the high-frequency domain and perform coding of a parameter indicating this degree of similarity.

With reference to the accompanying drawings, embodiments of the present invention will be explained in detail below.

Embodiment 1

Figure 2B:
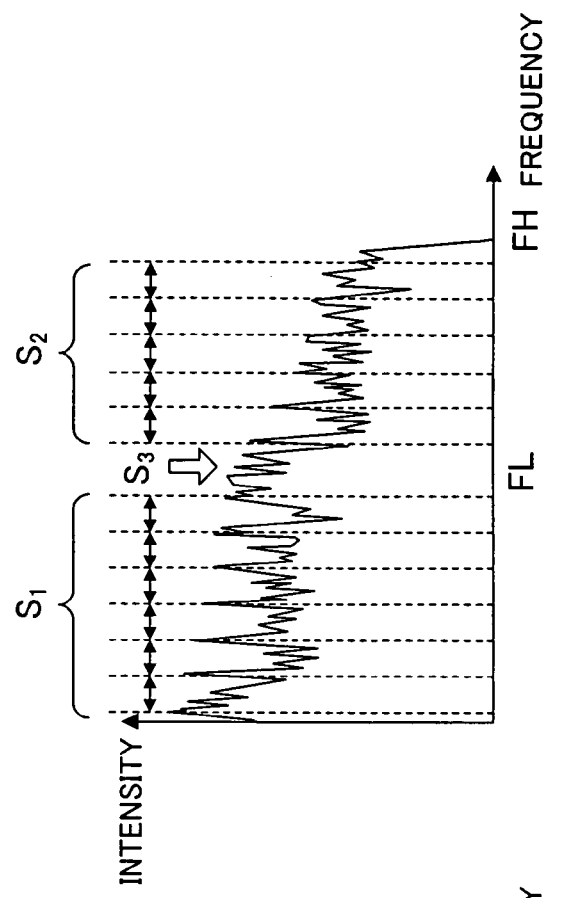
FIG. 2 is a diagram illustrating a problem of the conventional technology.
Figure 2A:
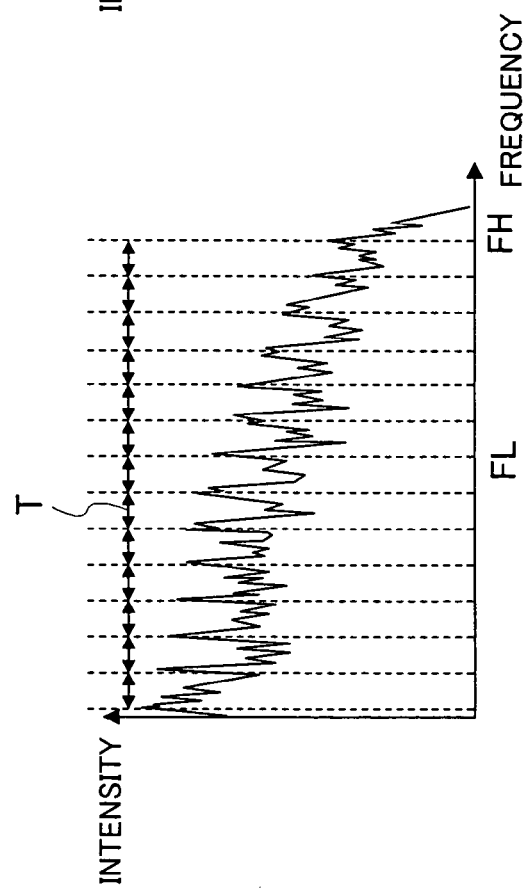
Figure 3:
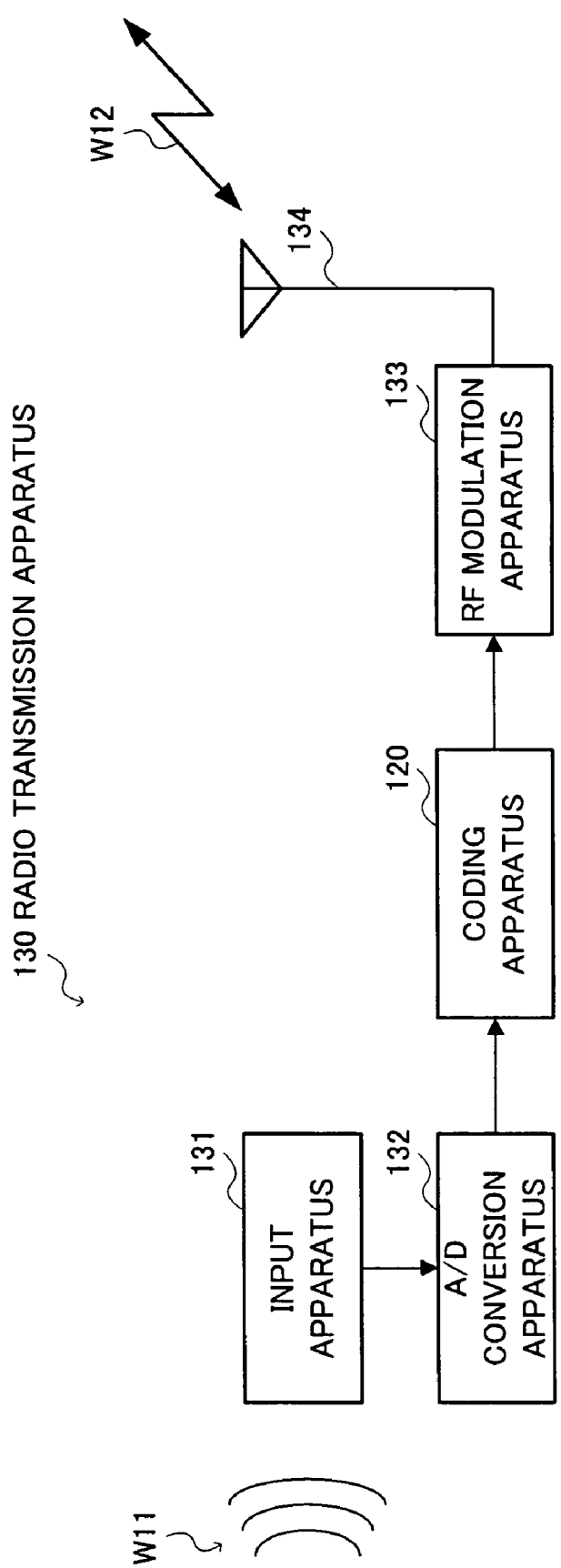
FIG. 3 is a block diagram showing the principal configuration of a radio transmission apparatus according to Embodiment 1.

FIG. 3 is a block diagram showing the principal configuration of radio transmission apparatus 130 when a radio coding apparatus according to Embodiment 1 of the present invention is mounted on the transmitting side of a radio communication system.

This radio transmission apparatus 130 includes coding apparatus 120, input apparatus 131, A/D conversion apparatus 132, RF modulation apparatus 133 and antenna 134.

Input apparatus 131 converts sound wave W11 audible to human ears to an analog signal which is an electric signal and outputs the signal to A/D conversion apparatus 132. A/D conversion apparatus 132 converts this analog signal to a digital signal and outputs the digital signal to coding apparatus 120. Coding apparatus 120 encodes the input digital signal, generates a coded signal and outputs the coded signal to RF modulation apparatus 133. RF modulation apparatus 133 modulates the coded signal, generates a modulated coded signal and outputs the modulated coded signal to antenna 134. Antenna 134 transmits the modulated coded signal as radio wave W12.

Figure 4:
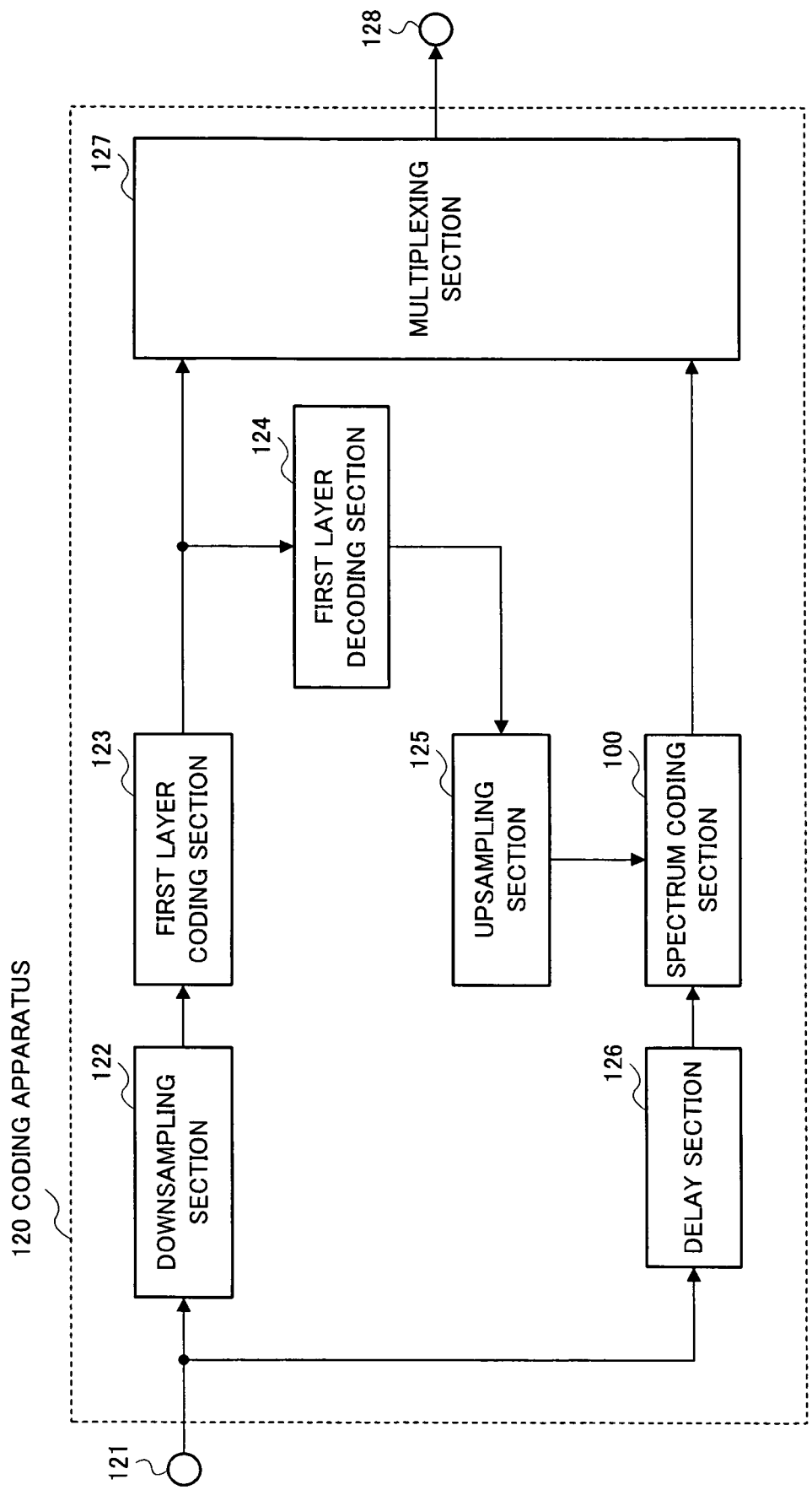
FIG. 4 is a block diagram showing the internal configuration of a coding apparatus according to Embodiment 1.

FIG. 4 is a block diagram showing the internal configuration of above described coding apparatus 120. Here, a case where hierarchical coding (scalable coding) is performed will be explained as an example.

Coding apparatus 120 includes input terminal 121, downsampling section 122, first layer coding section 123, first layer decoding section 124, upsampling section 125, delay section 126, spectrum coding section 100, multiplexing section 127 and output terminal 128.

A signal having an effective frequency band of 0≦k<FH is input from A/D conversion apparatus 132 to input terminal 121. Downsampling section 122 applies downsampling to the signal input via input terminal 121, generates a signal having a low sampling rate and outputs the signal. First layer coding section 123 encodes this downsampled signal, outputs the obtained code to multiplexing section (multiplexer) 127 and also outputs the obtained code to first layer decoding section 124. First layer decoding section 124 generates a decoded signal of a first layer based on the code. Upsampling section 125 increases the sampling rate of the decoded signal of first layer coding section 123.

On the other hand, delay section 126 provides a delay of a predetermined length to the signal input via input terminal 121. Suppose the length of this delay has the same value as a time delay produced when the signal is passed through downsampling section 122, first layer coding section 123, first layer decoding section 124 and upsampling section 125. Spectrum coding section 100 performs spectrum coding using the signal output from upsampling section 125 as a first signal and the signal output from delay section 126 as a second signal and outputs the generated code to multiplexing section 127. Multiplexing section 127 multiplexes the code obtained from first layer coding section 123 with the code obtained from spectrum coding section 100 and outputs the multiplexed parameter as an output code via output terminal 128. This output code is given to RF modulation apparatus 133.

Figure 5:
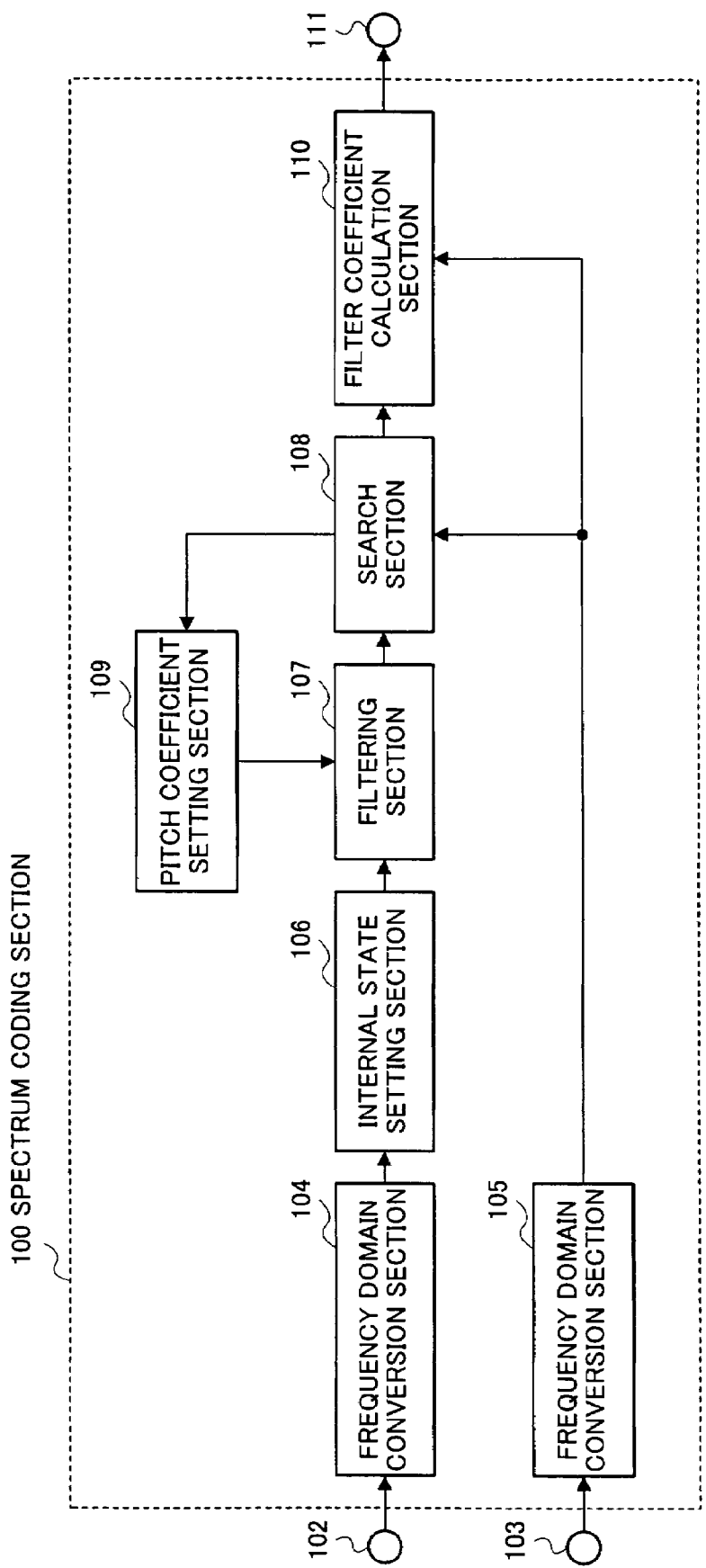
FIG. 5 is a block diagram showing the internal configuration of a spectrum coding section according to Embodiment 1.

FIG. 5 is a block diagram showing the internal configuration of above described spectrum coding section 100.

Spectrum coding section 100 includes input terminals 102, 103, frequency domain conversion sections 104, 105, internal state setting section 106, filtering section 107, search section 108, pitch coefficient setting section 109, filter coefficient calculation section 110 and output terminal 111.

The first signal is input from upsampling section 125 to input terminal 102. This first signal is a signal which is decoded by first layer decoding section 124 using a coded parameter coded by first layer coding section 123 and has an effective frequency band of 0≦k<FL. Furthermore, the second signal having an effective frequency band of 0≦k<FH (FL<FH) is input from delay section 126 to input terminal 103.

Frequency domain conversion section 104 performs frequency conversion on the first signal input from input terminal 102 and calculates first spectrum S1($k$). On the other hand, frequency domain conversion section 105 performs frequency conversion on the second signal input from input terminal 103 and calculates second spectrum S2($k$). Here, the frequency conversion method applies a discrete Fourier transform (DFT), discrete cosine transform (DCT), modified discrete cosine transform (MDCT) or the like are used.

Internal state setting section 106 sets the internal state of a filter used in filtering section 107 using first spectrum S1($k$) having an effective frequency band of 0≦k<FL. This setting will be explained later again.

Pitch coefficient setting section 109 outputs pitch coefficients T to filtering section 107 one by one while changing them little by little within a predetermined search range of $T_{min}$ to $T_{max}$.

Filtering section 107 performs filtering of the second spectrum based on the internal state of the filter set by internal state setting section 106 and pitch coefficient T output from pitch coefficient setting section 109 and calculates estimated value S'2($k$) of the first spectrum. Details of this filtering processing which will be described later.

Search section 108 calculates a degree of similarity which is a parameter indicating similarity between second spectrum S2($k$) output from frequency domain conversion section 105 and estimated value S'2($k$) of the second spectrum output from filtering section 107. This degree of similarity will be described in detail later. Calculation processing of this degree of similarity is performed every time pitch coefficient T is given from pitch coefficient setting section 109 and pitch coefficient T' (range of $T_{min}$ to $T_{max}$) whereby the calculated degree of similarity becomes a maximum is given to filter coefficient calculation section 110.

Filter coefficient calculation section 110 calculates filter coefficient $\beta_i$ using pitch coefficient T' given from search section 108 and outputs the filter coefficient via output terminal 111. At this time, pitch coefficient T' is also output via output terminal 111 simultaneously.

Next, specific operations of the principal components of spectrum coding section 100 will be explained in detail using mathematical expressions below.

Figure 6:
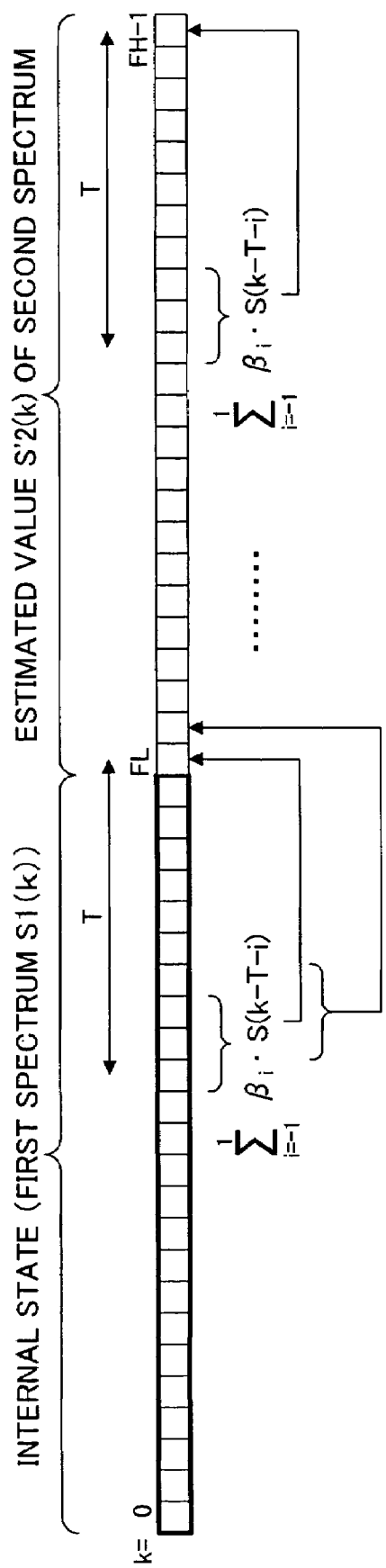
FIG. 6 is a diagram illustrating an overview of filtering processing of a filtering section according to Embodiment 1.

FIG. 6 illustrates an overview of filtering processing of filtering section 107.

Here, suppose spectra of all frequency bands (0≦k<FH) are called "S($k$)" for convenience and a filter function expressed by the following equation will be used.

$$P(z) = \frac{1}{1 - \sum_{i=-M}^{M} \beta_i z^{-T+i}}$$ (Equation 1)

In this equation, z denotes a z conversion variable, T denotes a coefficient given from pitch coefficient setting section 109 and suppose M=1.

As shown in this figure, first spectrum S1(*k*) is stored in band 0≦k<FL of S(k) as the internal state of the filter. On the other hand, estimated value S'2(*k*) of the second spectrum obtained from the following procedure is stored in band FL≦k<FH of S(k).

A spectrum expressed by the following equation (2) is substituted in S'2(*k*) thorough filtering processing. The substituted spectrum is obtained by adding all spectrum $\beta_i \cdot S(k-T-i)$, obtained by multiplying nearby spectrums S(k-T-i) separated by i centered on the spectrum S(k-T) having a frequency lower than k by T by predetermined weighting factor $\beta_i$.

$$S'2(k) = \sum_{i=-1}^{1} \beta_i \cdot S(k - T - i) \quad \text{(Equation 2)}$$

At this time, suppose the input signal given to this filter is zero. That is, (Equation 2) expresses a zero input response of (Equation 1). Estimated value S'2(*k*) of the second spectrum in FL≦k<FH is calculated by performing the above described calculations while changing k within a range FL≦k<FH in ascending order of frequencies (from k=FL).

The above described filtering processing is performed within range FL≦k<FH every time pitch coefficient T is given from pitch coefficient setting section 109 by clearing S(k) to zero every time. That is, S(k) is calculated every time pitch coefficient T changes and output to search section 108.

Next, calculation processing of the degree of similarity performed by search section 108 and derivation processing of optimum pitch coefficient T will be explained.

First, there are various definitions of the degree of similarity. Here, a case where the degree of similarity defined by the following equation based on a least square error method is used assuming that filter coefficients $\beta_{-1}$ and $\beta_1$ are 0 will be explained as an example.

$$E = \sum_{k=FL}^{FH-1} S2(k)^2 - \frac{\left(\sum_{k=FL}^{FH-1} S2(k) \cdot S'2(k)\right)^2}{\sum_{k=FL}^{FH-1} S'2(k)^2} \quad \text{(Equation 3)}$$

In the case where this degree of similarity is used, filter coefficient $\beta_i$ is determined after optimum pitch coefficient T is calculated. Here, E denotes a square error between S2(*k*) and S'2(*k*). In this equation, the first term of the right side becomes a fixed value which is irrelevant to pitch coefficient T, and therefore pitch coefficient T for generating S'2(*k*) which makes a maximum of the second term of the right side is searched. The second term of the right side of this equation will be called a "degree of similarity."

FIG. 7A to FIG. 7E are diagrams illustrating how the spectrum of estimated value S'2(*k*) of the second spectrum changes as pitch coefficient T changes.

Figure 7:
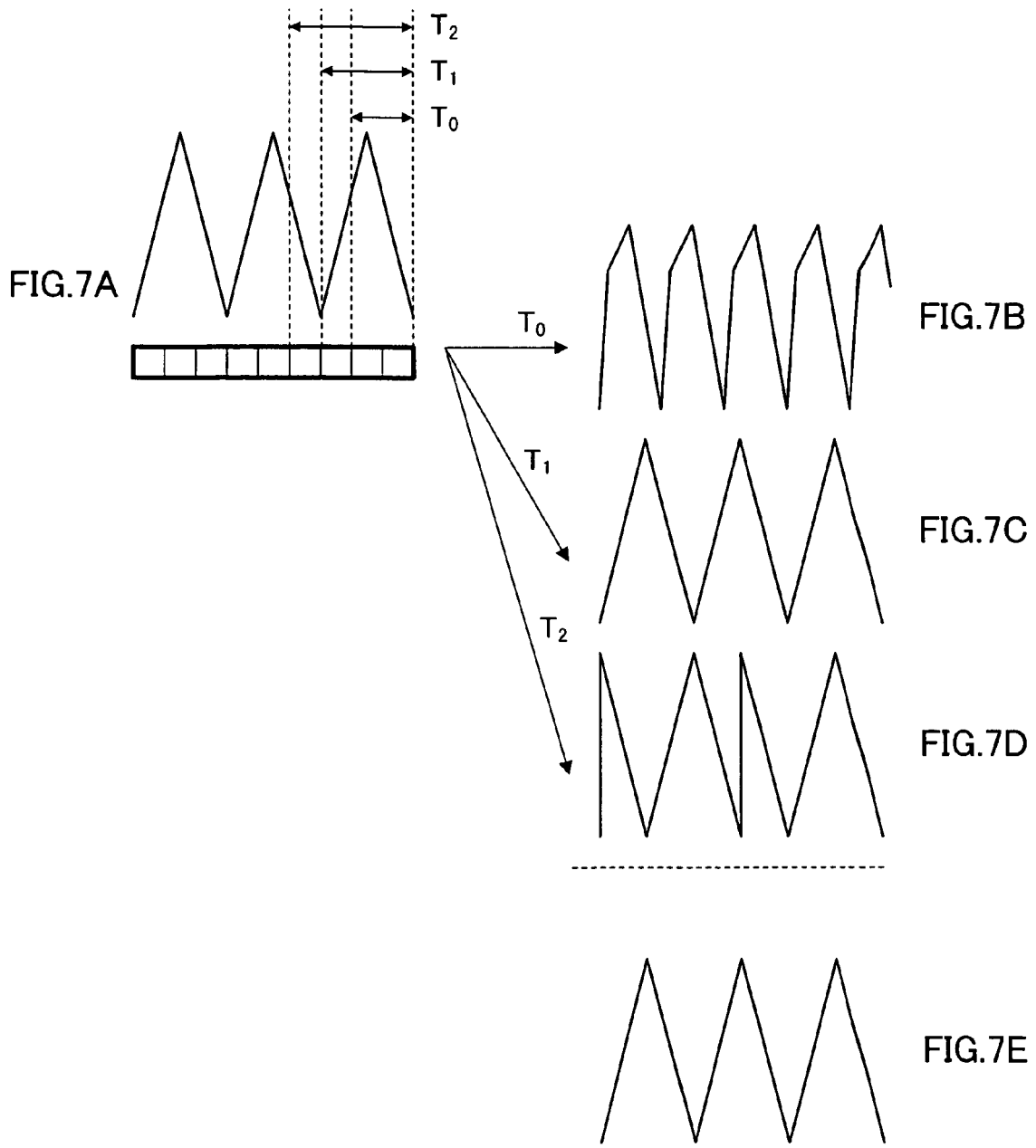
FIG. 7 is a diagram illustrating how a spectrum of an estimated value of a second spectrum changes as pitch coefficient T changes.
Figure 8:
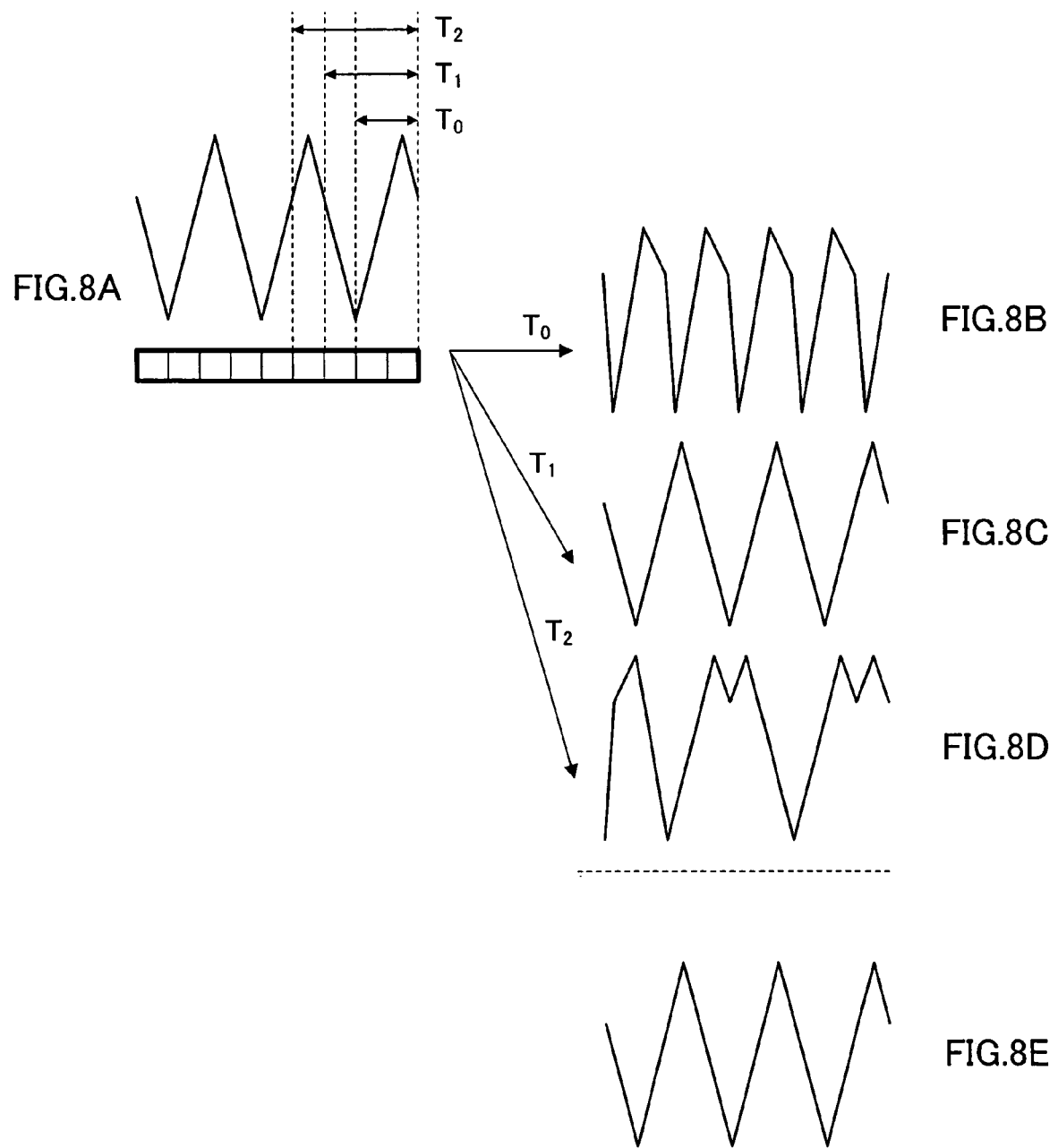
FIG. 8 is a diagram illustrating how a spectrum of an estimated value of a second spectrum changes as pitch coefficient T changes.

FIG. 7A is a diagram illustrating the first spectrum having a harmonic structure stored as an internal state. Furthermore, FIG. 7B to FIG. 7D are diagrams illustrating spectra of estimated values S'2(*k*) of the second spectrum calculated by performing filtering using three types of pitch coefficients $T_0$, $T_1$, $T_2$. FIG. 7E shows second spectrum S2(*k*) to be compared with the spectrum of estimated value S'2(*k*).

In the example shown in this figure, the spectrum shown in FIG. 7C is similar to the spectrum shown in FIG. 7E, and therefore it is realized that the degree of similarity calculated using $T_1$ shows the highest value. That is, $T_1$ is an optimum value as pitch coefficient T whereby the harmonic structure can be maintained.

FIG. 8A to FIG. 8E domain also figures similar to FIG. 7A to FIG. 7E, but here the phase of the first spectrum stored as the internal state is different from that of FIG. 7A to FIG. 7E. However, in the example shown in this figure, pitch coefficient T whereby the harmonic structure is maintained is also $T_1$.

Thus, changing pitch coefficient T and finding T of a maximum degree of similarity is equivalent to finding out a pitch (or an integer multiple thereof) of the harmonic structure of the spectrum on a try-and-error basis. The coding apparatus of this embodiment calculates estimated value S'2(*k*) of the second spectrum based on the pitch of this harmonic structure, and therefore the harmonic structure does not collapse in the connection area between the first spectrum and estimated spectrum. This is easily understandable considering that estimated value S'2(*k*) of the connection section when k=FL is calculated based on the first spectrum separated by pitch (or an integer multiple thereof) T of the harmonic structure.

Furthermore, pitch coefficient T expresses an integer multiple (integer value) of the frequency interval of the spectrum data. However, the pitch of the actual harmonic structure is often a non-integer value. Therefore, by selecting appropriate weighting factor $\beta_i$ and applying a weighted addition to M neighboring data centered on T, it is possible to express a pitch of the harmonic structure of a non-integer value within a range from T−M to T+M.

Figure 9:
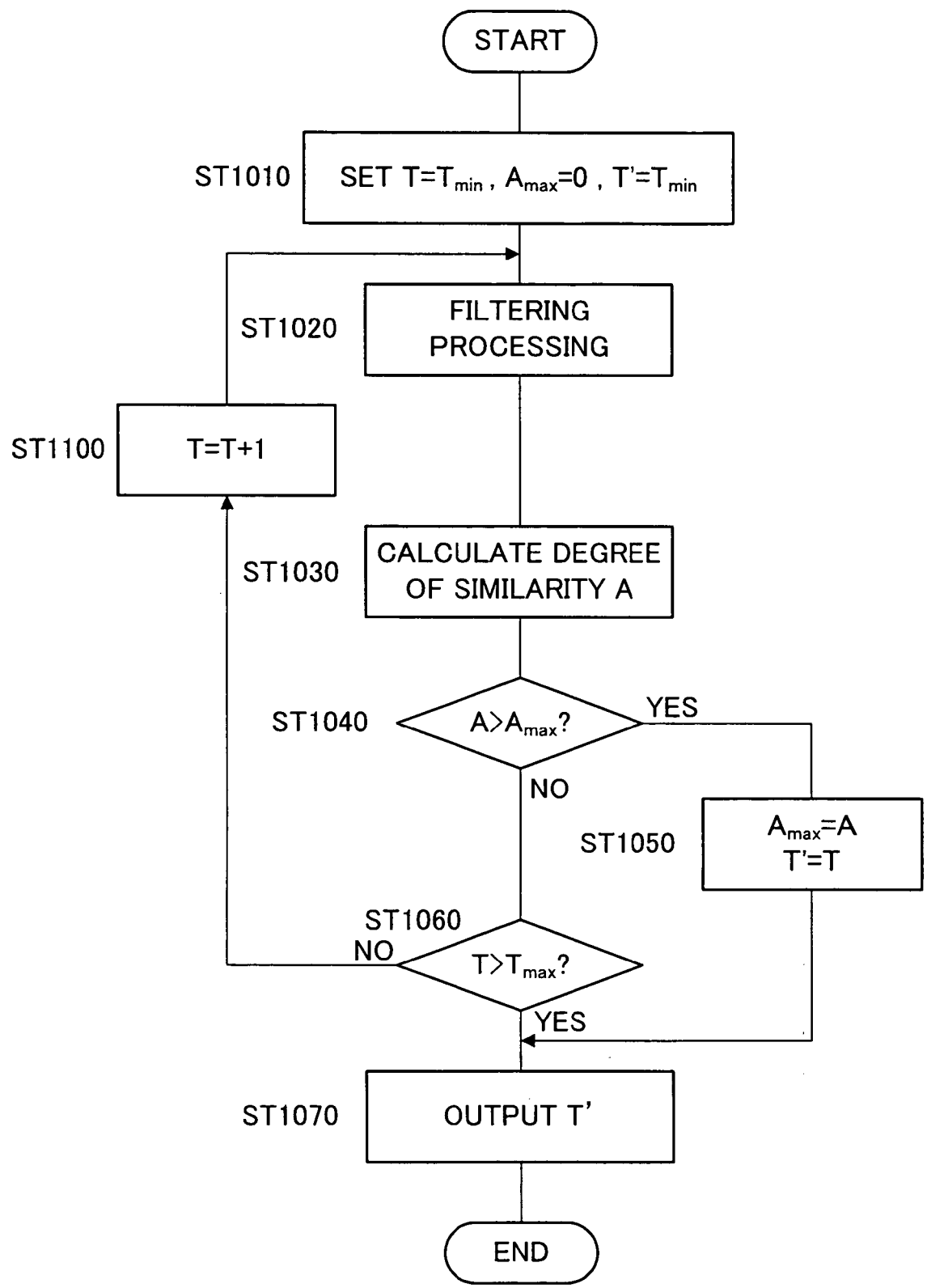
FIG. 9 is a flow chart showing an example of a series of algorithms of processes carried out by the filtering section, search section and pitch coefficient setting section according to Embodiment 1.

FIG. 9 is a flow chart showing an example of a series of algorithms of processes performed by filtering section 107, search section 108 and pitch coefficient setting section 109. An overview of these processes has already been explained, and therefore detailed explanations of the flow will be omitted.

Next, the calculation processing of a filter coefficient by filter coefficient calculation section 110 will be explained.

Filter coefficient calculation section 110 determines filter coefficient $\beta_i$ that minimizes square distortion E in the following equation using pitch coefficient T' given from search section 108.

$$E = \sum_{k=FL}^{FH-1} \left( S2(k) - \sum_{i=-1}^{1} \beta_i S(k - T' - i) \right)^2 \quad \text{(Equation 4)}$$

Filter coefficient calculation section 110 holds a combination of a plurality of βi (i=−1,0,1) as a data table beforehand, determines a combination of βi (i=−1,0,1) that minimizes square distortion E of above described (Equation 4) and outputs an index thereof.

Thus, for the spectrum of an input signal divided into two parts of a low-frequency domain (0≦k<FL) and high-frequency domain (FL≦k<FH), the coding apparatus of this embodiment estimates the shape of the high-frequency spectrum using filtering section 107 that includes the low-frequency spectrum as the internal state, encodes and outputs a parameter indicating the filter characteristic of filtering section 107 instead of the high-frequency spectrum, and therefore, it is possible to perform coding of the spectrum at a low bit rate and with high quality.

Furthermore, in the above described configuration, when filtering section 107 estimates the shape of the high-frequency spectrum using the low-frequency spectrum, pitch coefficient setting section 109 changes the frequency difference between the low-frequency spectrum which serves as a reference for estimation and the high-frequency spectrum, that is, pitch coefficient T, in various ways and outputs the frequency difference, and search section 108 detects T corresponding to a maximum degree of similarity between the low-frequency spectrum and high-frequency spectrum. Therefore, it is possible to estimate the shape of the high-frequency spectrum based on the pitch of the harmonic structure of the overall spectrum and perform coding while maintaining the harmonic structure of the overall spectrum.

Furthermore, there is no need for setting the bandwidth of the low-frequency spectrum based on the pitch of the harmonic structure. That is, it is not necessary to match the bandwidth of the low-frequency spectrum to the pitch of the harmonic structure (or an integer multiple thereof), and it is possible to set a bandwidth arbitrarily. This is because the above described configuration allows spectra to be connected smoothly in the connection section between the low-frequency spectrum and high-frequency spectrum without matching the bandwidth of the low-frequency spectrum to the pitch of the harmonic structure.

This embodiment has explained the case where M=1 in (Equation 1) as an example, but M is not limited to this and an integer (natural number) of 0 or greater can also be used.

Furthermore, this embodiment has explained the coding apparatus that performs hierarchical coding (scalable coding) as an example, but above described spectrum coding section 100 can also be mounted on a coding apparatus that performs coding based on other schemes.

Furthermore, this embodiment has explained the case where spectrum coding section 100 includes frequency domain conversion sections 104, 105. These are components necessary when a time domain signal is used as an input signal, but the frequency domain conversion section is not necessary in a structure in which the spectrum is directly input to spectrum coding section 100.

Furthermore, this embodiment has explained the case where the high-frequency spectrum is coded using the low-frequency spectrum, that is, using the low-frequency spectrum as a reference for coding, but the method of setting the spectrum which serves as a reference is not limited to this, and it is also possible to perform coding of the low-frequency spectrum using the high-frequency spectrum or perform coding of the spectra of other regions using the spectrum of an intermediate frequency band as a reference for coding though these are not desirable from the standpoint of effectively using energy.

Figure 10:
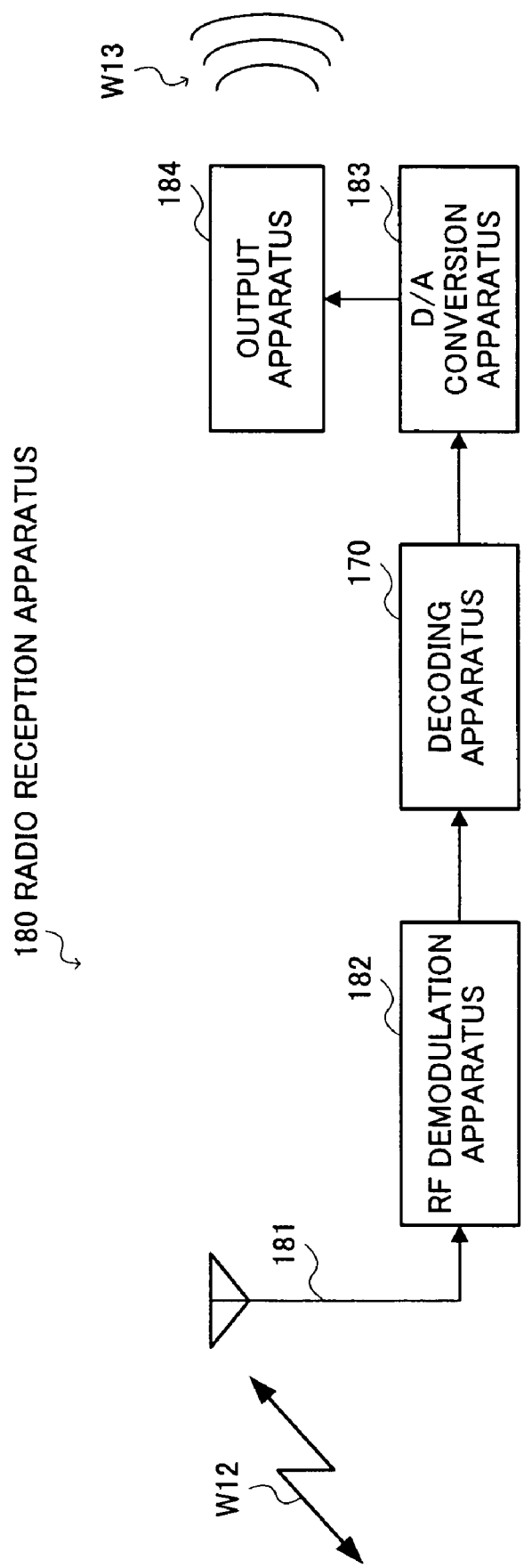
FIG. 10 is a block diagram showing the principal configuration of a radio reception apparatus according to Embodiment 1.

FIG. 10 is a block diagram showing the principal configuration of radio reception apparatus 180 that receives a signal transmitted from radio transmission apparatus 130.

This radio reception apparatus 180 includes antenna 181, RF demodulation apparatus 182, decoding apparatus 170, D/A conversion apparatus 183 and output apparatus 184.

Antenna 181 receives a digital coded acoustic signal as radio wave W12, generates a digital received coded acoustic signal which is an electric signal and provides it to RF demodulation apparatus 182. RF demodulation apparatus 182 demodulates the received coded acoustic signal from antenna 181, generates the demodulated coded acoustic signal and provides it to decoding apparatus 170.

Decoding apparatus 170 receives the digital demodulated coded acoustic signal from RF demodulation apparatus 182, performs decoding processing, generates a digital decoded acoustic signal and provides it to D/A conversion apparatus 183. D/A conversion apparatus 183 converts the digital decoded voice signal from decoding apparatus 170, generates an analog decoded voice signal and provides it to output apparatus 184. Output apparatus 184 converts the analog decoded voice signal which is an electric signal to air vibration and outputs it as sound wave W13 so as to be audible to human ears.

Figure 11:
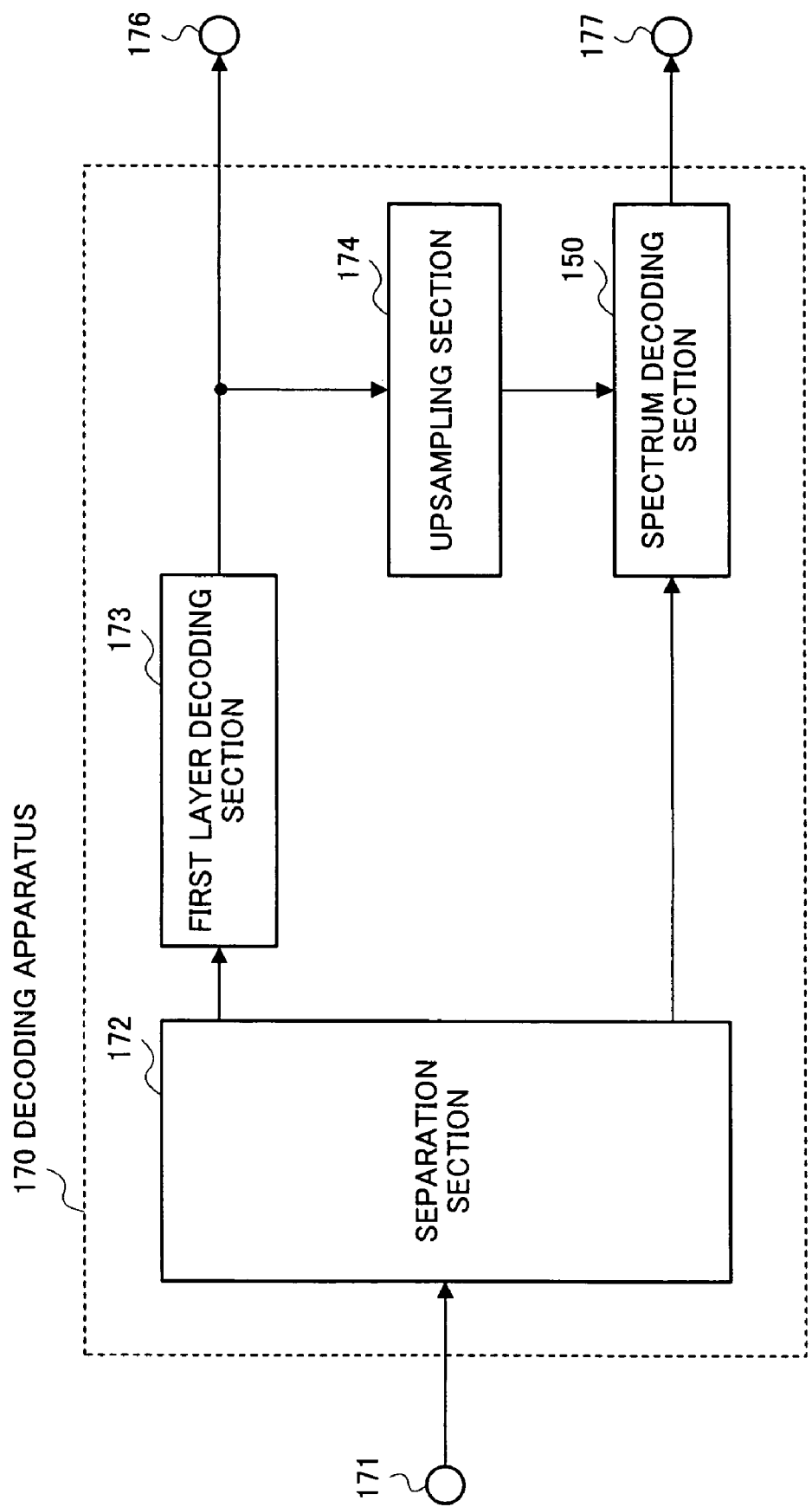
FIG. 11 is a block diagram showing the internal configuration of a decoding apparatus according to Embodiment 1.

FIG. 11 is a block diagram showing the internal configuration of above described decoding apparatus 170. Here, a case where a signal subjected to hierarchical coding is decoded will be explained as an example.

This decoding apparatus 170 includes input terminal 171, separation section 172, first layer decoding section 173, upsampling section 174, spectrum decoding section 150 and output terminals 176, 177.

RF demodulation apparatus 182 inputs digital demodulated coded acoustic signal to input terminal 171. Separation section 172 separates the demodulated coded acoustic signal input via input terminal 171 and generates a code for first layer decoding section 173 and a code for spectrum decoding section 150. First layer decoding section 173 decodes the decoded signal having signal band $0 \leq k < FL$ using the code obtained from separation section 172 and provides this decoded signal to upsampling section 174. Furthermore, the other output is connected to output terminal 176. This allows, when the first layer decoded signal generated by first layer decoding section 173 needs to be output, the first layer decoded signal can be output via this output terminal 176.

Upsampling section 174 increases the sampling frequency of the first layer decoded signal provided from first layer decoding section 173. Spectrum decoding section 150 is given the code separated by separation section 172 and the upsampled first layer decoded signal generated by upsampling section 174. Spectrum decoding section 150 performs spectrum decoding which will be described later, generates a decoded signal having signal band $0 \leq k < FH$ and outputs the decoded signal via output terminal 177. Spectrum decoding section 150 regards the upsampled first layer decoded signal provided from upsampling section 174 as the first signal and performs processing.

According to this configuration, when the first layer decoded signal generated by first layer decoding section 173 needs to be output, the first layer decoded signal can be output from output terminal 176. Furthermore, when an output signal of higher quality of spectrum decoding section 150 needs to be output, the output signal can be output from output terminal 177. Decoding apparatus 170 outputs either one of signals output from terminal 176 or output terminal 177 and provides the signal to D/A conversion apparatus 183. Which signal is to be output depends on the setting of the application or judgment of the user.

Figure 12:
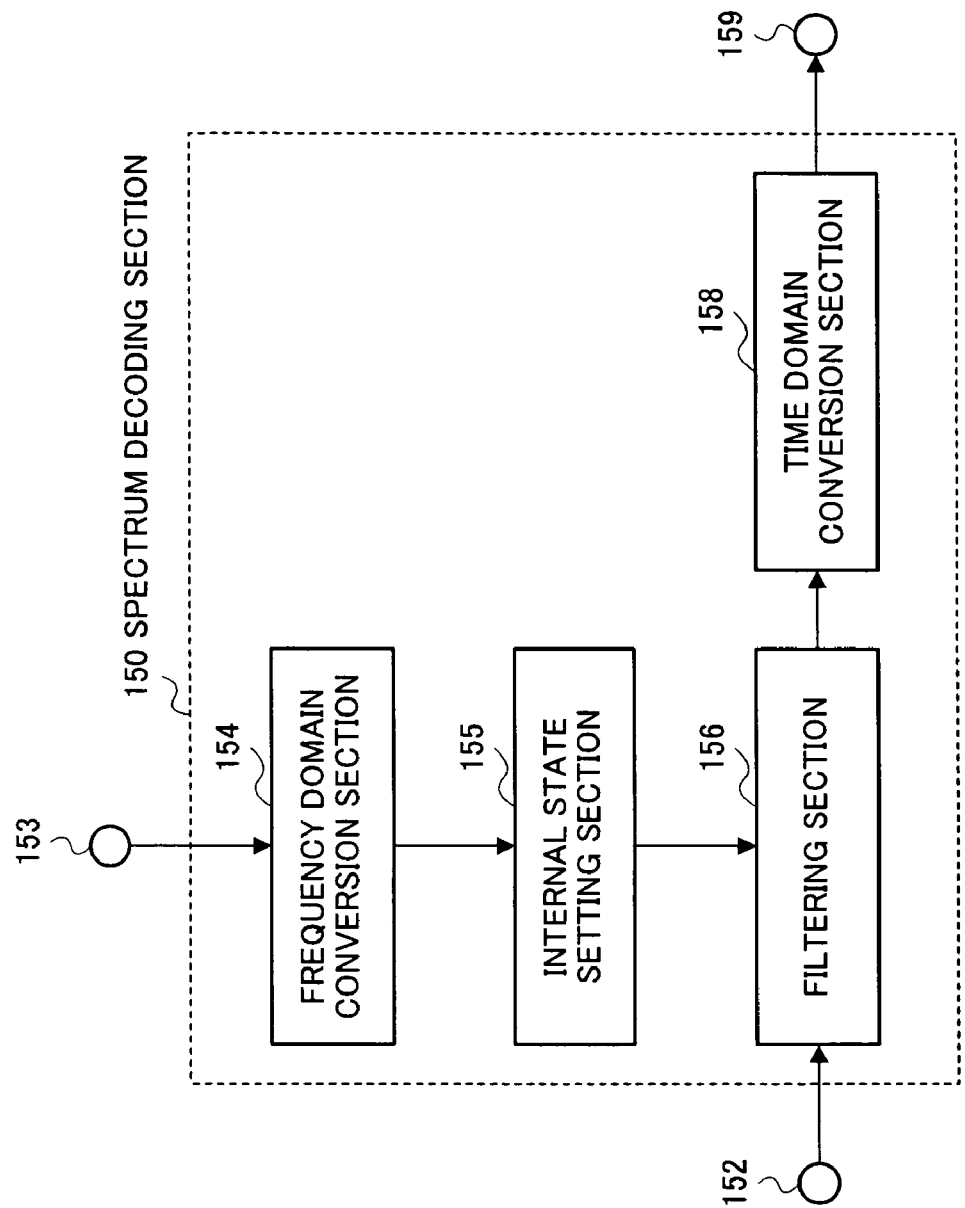
FIG. 12 is a block diagram showing the internal configuration of a spectrum decoding section according to Embodiment 1.

FIG. 12 is a block diagram showing the internal configuration of above described spectrum decoding section 150.

This spectrum decoding section 150 includes input terminals 152, 153, frequency domain conversion section 154, internal state setting section 155, filtering section 156, time domain conversion section 158 and output terminal 159.

A filter coefficient indicating a code obtained by spectrum coding section 100 is input to input terminal 152 via separation section 172. Furthermore, a first signal having an effective frequency band of $0 \leq k < FL$ is input to input terminal 153.

This first signal is the first layer decoded signal decoded by first layer decoding section 173 and upsampled by upsampling section 174.

Frequency domain conversion section 154 converts the frequency of the time domain signal input from input terminal 153 and calculates first spectrum S1(k). As the frequency conversion method, a discrete Fourier transform (DFT), discrete cosine transform (DCT), modified discrete cosine transform (MDCT) or the like is used.

Internal state setting section 155 sets the internal state of a filter used in filtering section 156 using first spectrum S1(k).

Filtering section 156 performs filtering of the first spectrum based on the internal state of the filter set by internal state setting section 155 and pitch coefficient T' and filter coefficient β provided from input terminal 152 and calculates estimated value S'2(k) of the second spectrum. In this case, filtering section 156 uses the filter function described in (Equation 1).

Time domain conversion section 158 converts decoded spectrum S'(k) obtained from filtering section 156 to a time domain signal and outputs the decoded spectrum via output terminal 159. Here, processing such as appropriate windowing and overlapped addition is performed as required to avoid discontinuation that may occur between frames.

Figure 13:
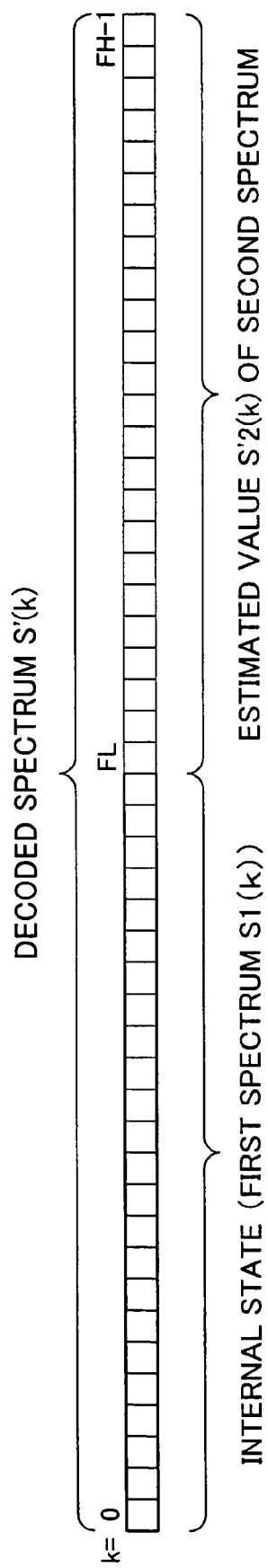
FIG. 13 is a diagram illustrating a decoded spectrum generated by a filtering section according to Embodiment 1.

FIG. 13 shows decoded spectrum S'(k) generated by filtering section 156.

As shown in this figure, decoded spectrum S'(k) having frequency band 0≦k<FL consists of first spectrum S1(k) and decoded spectrum S'(k) having frequency band FL≦k<FH consists of estimated value S'2(k) of the second spectrum.

Thus, the decoding apparatus of this embodiment has the configuration corresponding to the coding method according to this embodiment, and therefore, it is possible to decode a coded acoustic signal efficiently with fewer bits and output an acoustic signal of high quality.

Here, the case where the coding apparatus or decoding apparatus according to this embodiment is applied to a radio communication system has been explained as an example, but the coding apparatus or decoding apparatus according to this embodiment is also applicable to a wired communication system as shown below.

Figure 14A:
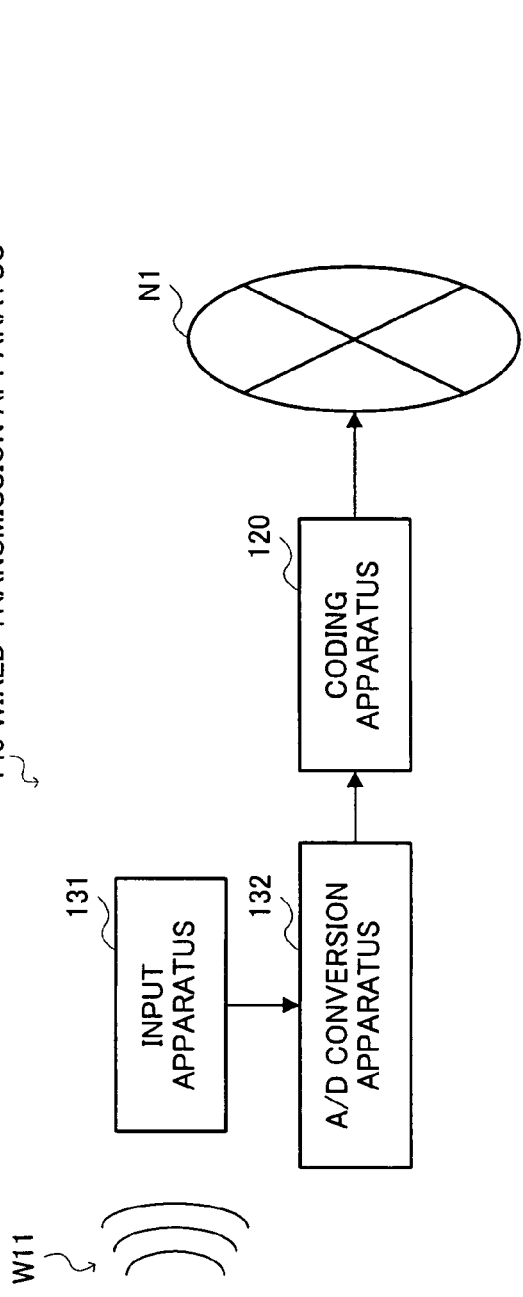
FIG. 14A is a block diagram showing the principal configuration of the transmitting side when the coding apparatus according to Embodiment 1 is applied to a wired communication system.

FIG. 14A is a block diagram showing the principal configuration of the transmitting side when the coding apparatus according to this embodiment is applied to a wired communication system. The same components as those shown in FIG. 3 are assigned the same reference numerals and explanations thereof will be omitted.

Wired transmission apparatus 140 includes coding apparatus 120, input apparatus 131 and A/D conversion apparatus 132 and an output thereof is connected to network N1.

The input terminal of A/D conversion apparatus 132 is connected to the output terminal of input apparatus 131. The input terminal of coding apparatus 120 is connected to the output terminal of A/D conversion apparatus 132. The output terminal of coding apparatus 120 is connected to network N1.

Input apparatus 131 converts sound wave W11 audible to human ears to an analog signal which is an electric signal and provides it to A/D conversion apparatus 132. A/D conversion apparatus 132 converts the analog signal to a digital signal and provides the digital signal to coding apparatus 120. Coding apparatus 120 encodes the input digital signal, generates a code and outputs the code to network N1.

Figure 14B:
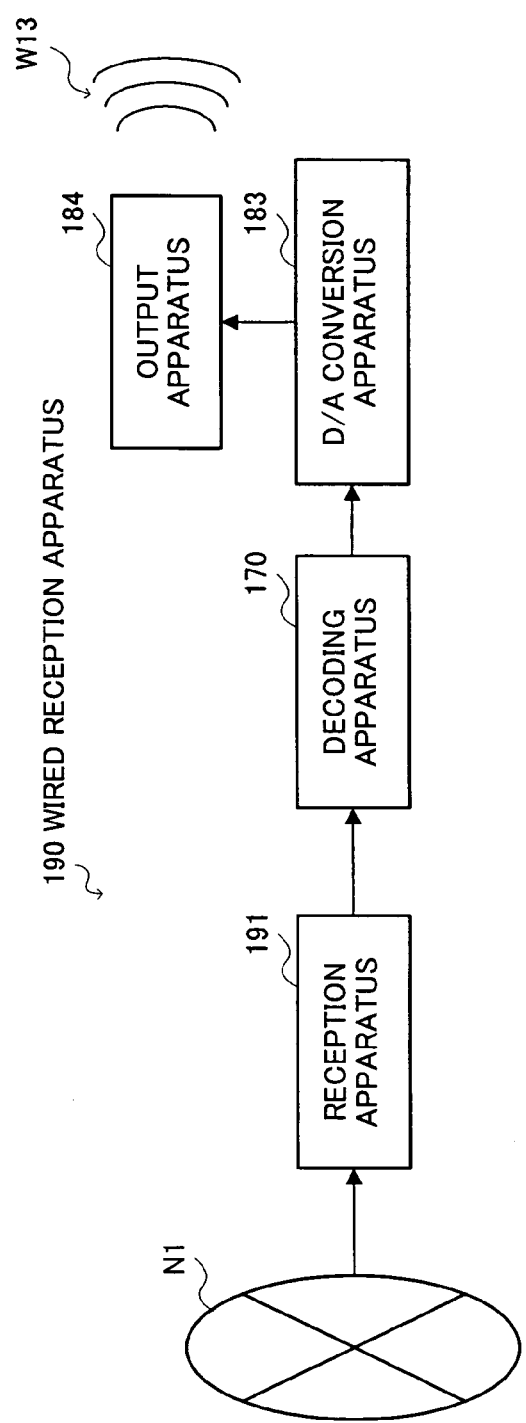
FIG. 14B is a block diagram showing the principal configuration of the receiving side when the decoding apparatus according to Embodiment 1 is applied to a wired communication system.

FIG. 14B is a block diagram showing the principal configuration of the receiving side when the decoding apparatus according to this embodiment is applied to a wired communication system. The same components as those shown in FIG. 10 are assigned the same reference numerals and explanations thereof will be omitted.

Wired reception apparatus 190 includes reception apparatus 191 connected to network N1, decoding apparatus 170, D/A conversion apparatus 183 and output apparatus 184.

The input terminal of reception apparatus 191 is connected to network N1. The input terminal of decoding apparatus 170 is connected to the output terminal of reception apparatus 191. The input terminal of D/A conversion apparatus 183 is connected to the output terminal of decoding apparatus 170. The input terminal of output apparatus 184 is connected to the output terminal of D/A conversion apparatus 183.

Reception apparatus 191 receives a digital coded acoustic signal from network N1, generates a digital received acoustic signal and provides the signal to decoding apparatus 170. Decoding apparatus 170 receives the received acoustic signal from reception apparatus 191, performs decoding processing on this received acoustic signal, generates a digital decoded acoustic signal and provides it to D/A conversion apparatus 183. D/A conversion apparatus 183 converts the digital decoded voice signal from decoding apparatus 170, generates an analog decoded voice signal and provides it to output apparatus 184. Output apparatus 184 converts the analog decoded acoustic signal which is an electric signal to air vibration and outputs it as sound wave W13 audible to human ears.

Thus, according to the above described configuration, it is possible to provide a wired transmission/reception apparatus having operations and effects similar to those of the above described radio transmission/reception apparatus.

Embodiment 2

Figure 15:
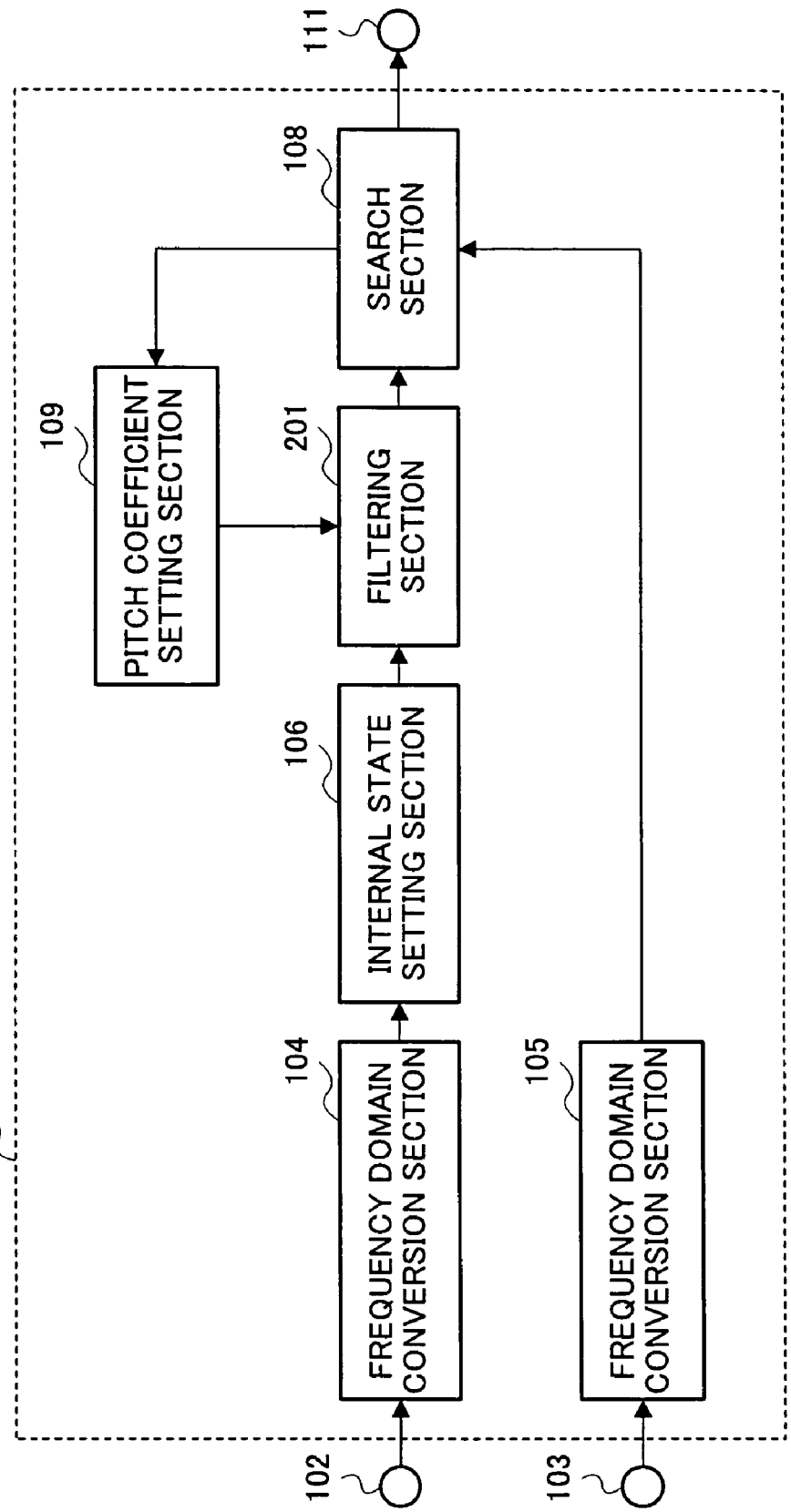
FIG. 15 is a block diagram showing the principal configuration of a spectrum coding section according to Embodiment 2.

FIG. 15 is a block diagram showing the principal configuration of spectrum coding section 200 in a coding apparatus according to Embodiment 2 of the present invention. This spectrum coding section 200 has a basic configuration similar to that of spectrum coding section 100 shown in FIG. 5 and the same components are assigned the same reference numerals and explanations thereof will be omitted.

A feature of this embodiment is to make a filter function used in the filtering section simpler than that in Embodiment 1.

For the filter function used in filtering section 201, a simplified one as shown in the following equation is used.

$$P(z) = \frac{1}{1 - z^{-T}} \qquad \text{(Equation 5)}$$

This equation corresponds to a filter function assuming M=0, $\beta_0$=1 in (Equation 1).

Figure 16:
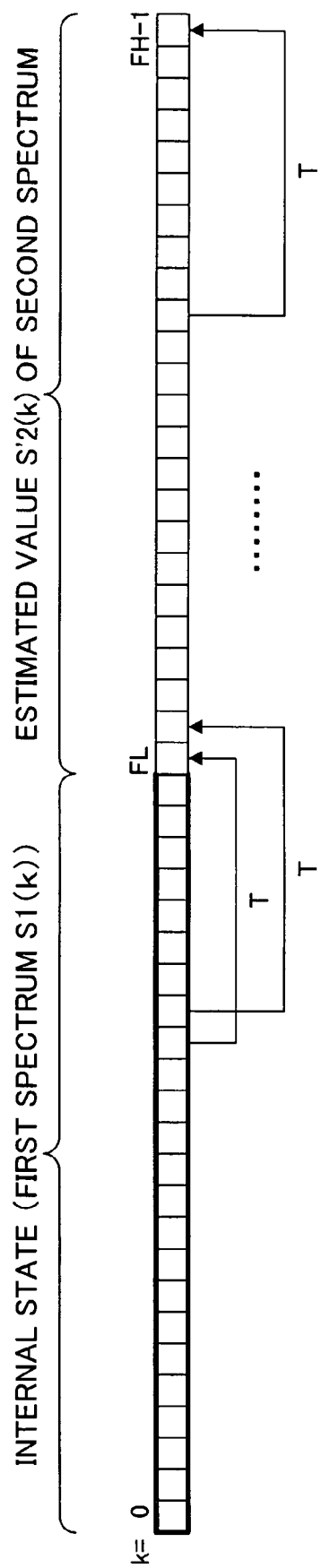
FIG. 16 is a diagram illustrating an overview of filtering using a filter according to Embodiment 2.

FIG. 16 illustrates an overview of filtering using the above described filter.

Estimated value S'2(k) of a second spectrum is obtained by sequentially copying low-frequency spectra separated by T. Furthermore, search section 108 determines optimum pitch coefficient T' by searching for pitch coefficient T which minimizes E of (Equation 3) as in the case of Embodiment 1. Pitch coefficient T' obtained in this way is output via output terminal 111. In this configuration, the characteristic of the filter is determined only by pitch coefficient T.

Note that the filter of this embodiment is characterized in that it operates in a way similar to an adaptive codebook, one of components of a CELP (Code-Excited Linear Prediction) scheme which is a representative technology of low-rate voice coding.

Next, the spectrum decoding section that decodes a signal coded by above described spectrum coding section 200 will be explained (not shown).

This spectrum decoding section has a configuration similar to that of spectrum decoding section 150 shown in FIG. 12, and therefore detailed explanations thereof will be omitted, and it has the following features. That is, when filtering section 156 calculates estimated value S'2($k$) of the second spectrum, it uses the filter function described in (Equation 5) instead of the filter function described in (Equation 1). It is only pitch coefficient T' that is provided from input terminal 152. That is, which of the filter function described in (Equation 1) or (Equation 5) should be used is determined depending on the type of the filter function used on the coding side and the same filter function used on the coding side is used.

Thus, according to this embodiment, the filter function used in the filtering section is made simpler, which result in eliminating the necessity for installing a filter coefficient calculation section. Therefore, it is possible to estimate the second spectrum (high-frequency spectrum) with a smaller amount of calculation and also reduce the circuit scale.

Embodiment 3

Figure 17:
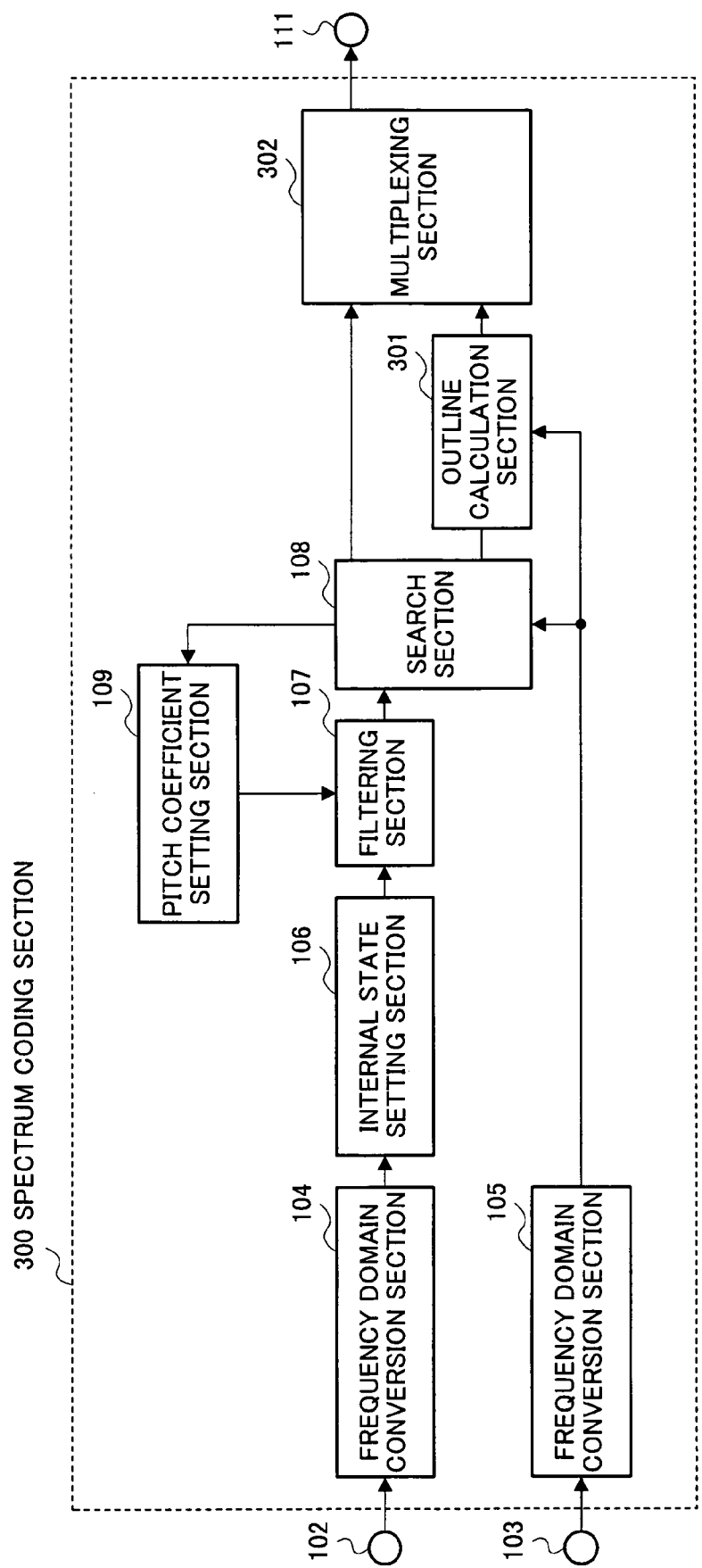
FIG. 17 is a block diagram showing the principal configuration of a spectrum coding section according to Embodiment 3.

FIG. 17 is a block diagram showing the principal configuration of spectrum coding section 300 in a coding apparatus according to Embodiment 3 of the present invention. This spectrum coding section 300 has a basic configuration similar to that of spectrum coding section 100 shown in FIG. 5 and the same components are assigned the same reference numerals and explanations thereof will be omitted.

A feature of this embodiment is to further comprise outline calculation section 301 and multiplexing section 302 and perform coding of envelope information about a second spectrum after estimating the second spectrum.

Search section 108 outputs optimum pitch coefficient T' to multiplexing section 302 and outputs estimated value S'2($k$) of the second spectrum generated using this pitch coefficient T' to outline calculation section 301. Outline calculation section 301 calculates envelope information about second spectrum S2($k$) based on second spectrum S2($k$) provided from frequency domain conversion section 105. Here, a case where this envelope information is expressed by spectrum power for each subband and frequency band FL≦k<FH is divided into J subbands will be explained as an example. At this time, the spectrum power of the jth subband is expressed by the following equation.

$$B(j) = \sum_{k=BL(j)}^{BH(j)} S2(k)^2 \quad \text{(Equation 6)}$$

In this equation, BL(j) denotes a minimum frequency of the $j^{th}$ subband, BH(j) denotes a maximum frequency of the $j^{th}$ subband. The subband information of the second spectrum obtained in this way is regarded as the spectrum envelope information about the second spectrum.

In a similar fashion, subband information B'(j) of estimated value S'2($k$) on the second spectrum is calculated according to the following equation, $$B'(j) = \sum_{k=BL(j)}^{BH(j)} S'2(k)^2 \quad \text{(Equation 7)}$$

and amount of variation V(j) for each subband is calculated according to the following equation.

$$V(j) = \sqrt{\frac{B(j)}{B'(j)}} \quad \text{(Equation 8)}$$

Next, outline calculation section 301 encodes amount of variation V(j), obtains the coded amount of variation V(j) and outputs the index thereof to multiplexing section 302. Multiplexing section 302 multiplexes optimum pitch coefficient T' obtained from search section 108 and an index of amount of variation V(j) output from outline calculation section 301 and outputs the multiplexing result via output terminal 111.

Thus, this embodiment makes it possible to improve an accuracy of the estimated value of the high-frequency spectrum since the envelope information about the high-frequency spectrum is further coded after a high-frequency spectrum is estimated.

Embodiment 4

Figure 18:
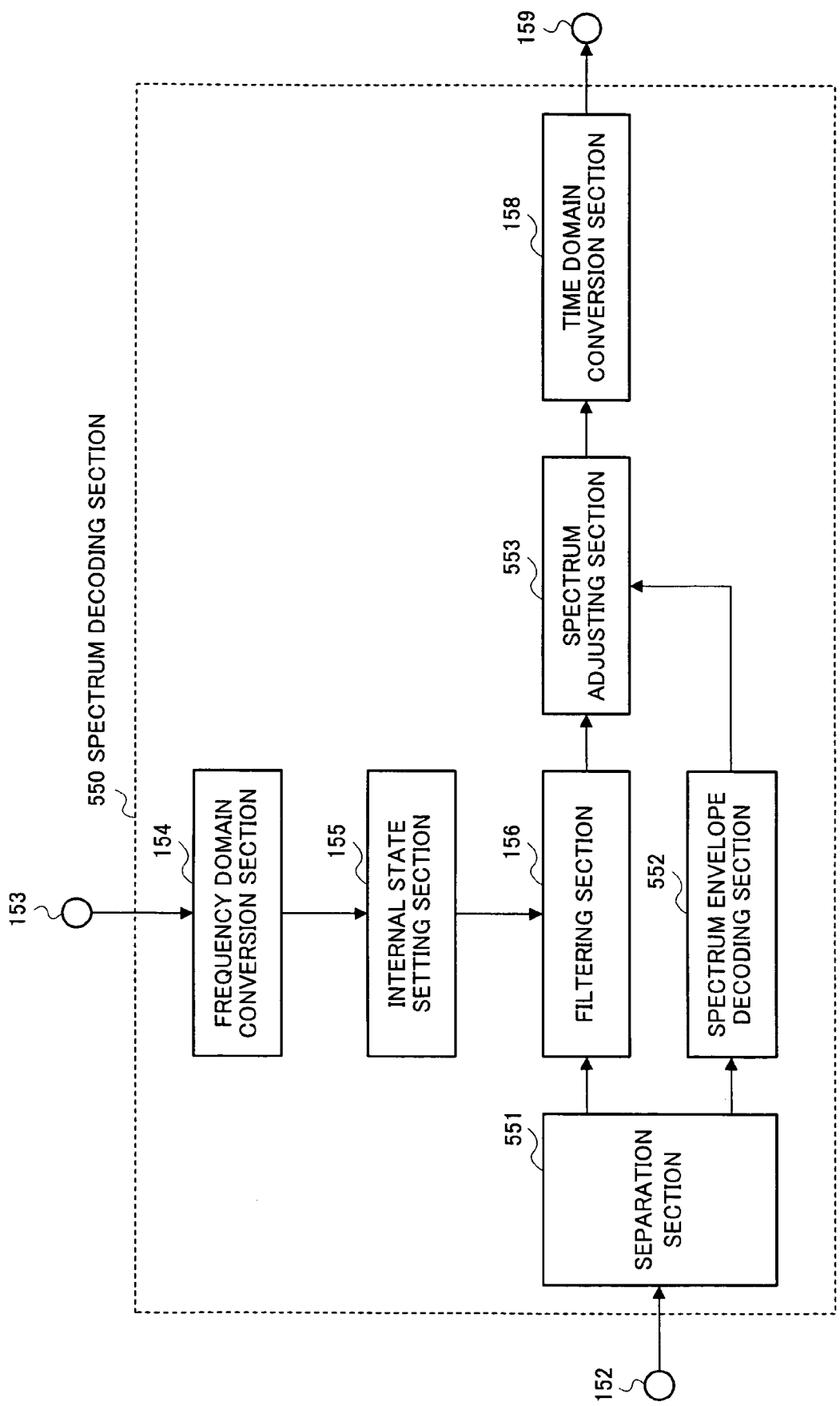
FIG. 18 is a block diagram showing the principal configuration of a spectrum decoding section according to Embodiment 4.

FIG. 18 is a block diagram showing the principal configuration of spectrum decoding section 550 according to Embodiment 4 of the present invention. This spectrum decoding section 550 has a basic configuration similar to that of spectrum decoding section 150 shown in FIG. 12, and therefore the same components are assigned the same reference numerals and explanations thereof will be omitted.

A feature of this embodiment is to further comprise separation section 551, spectrum envelope decoding section 552 and spectrum adjusting section 553. This allows spectrum coding section 300 or the like shown in Embodiment 3 to perform decoding of a code resulting from coding of envelope information as well as coding of an estimated spectrum of a high-frequency spectrum.

Separation section 551 separates a code input via input terminal 152, provides information about a filtering coefficient to filtering section 156 and provides information about a spectrum envelope to spectrum envelope decoding section 552.

Spectrum envelope decoding section 552 decodes amount of variation $V_q(j)$ obtained by coding amount of variation V(j) from the spectrum envelope information given from separation section 551.

Spectrum adjusting section 553 multiplies decoded spectrum S'($k$) obtained from filtering section 156 by decoded amount of variation $V_q(j)$ for each subband obtained from spectrum envelop decoding section 552 according to the following equation, $$S3(k)=S'(k) \cdot V_q(j)(BL(j) \leq k \leq BH(j), \text{ for all } j) \quad \text{(Equation 9)}$$

adjusts a spectral shape in frequency band FL≦k<FH of decoded spectrum S'($k$) and generates adjusted decoded spectrum S3($k$). This adjusted decoded spectrum S3($k$) is output to time domain conversion section 158 and converted to a time domain signal.

Thus, according to this embodiment, it is possible to decode a code including envelope information.

This embodiment has explained the case where the spectrum envelope information provided from separation section 551 is value $V_q(j)$ obtained by coding amount of variation $V(j)$ for each subband shown in (Equation 8) as an example, but the spectrum envelope information is not limited to this.

Embodiment 5

Figure 19:
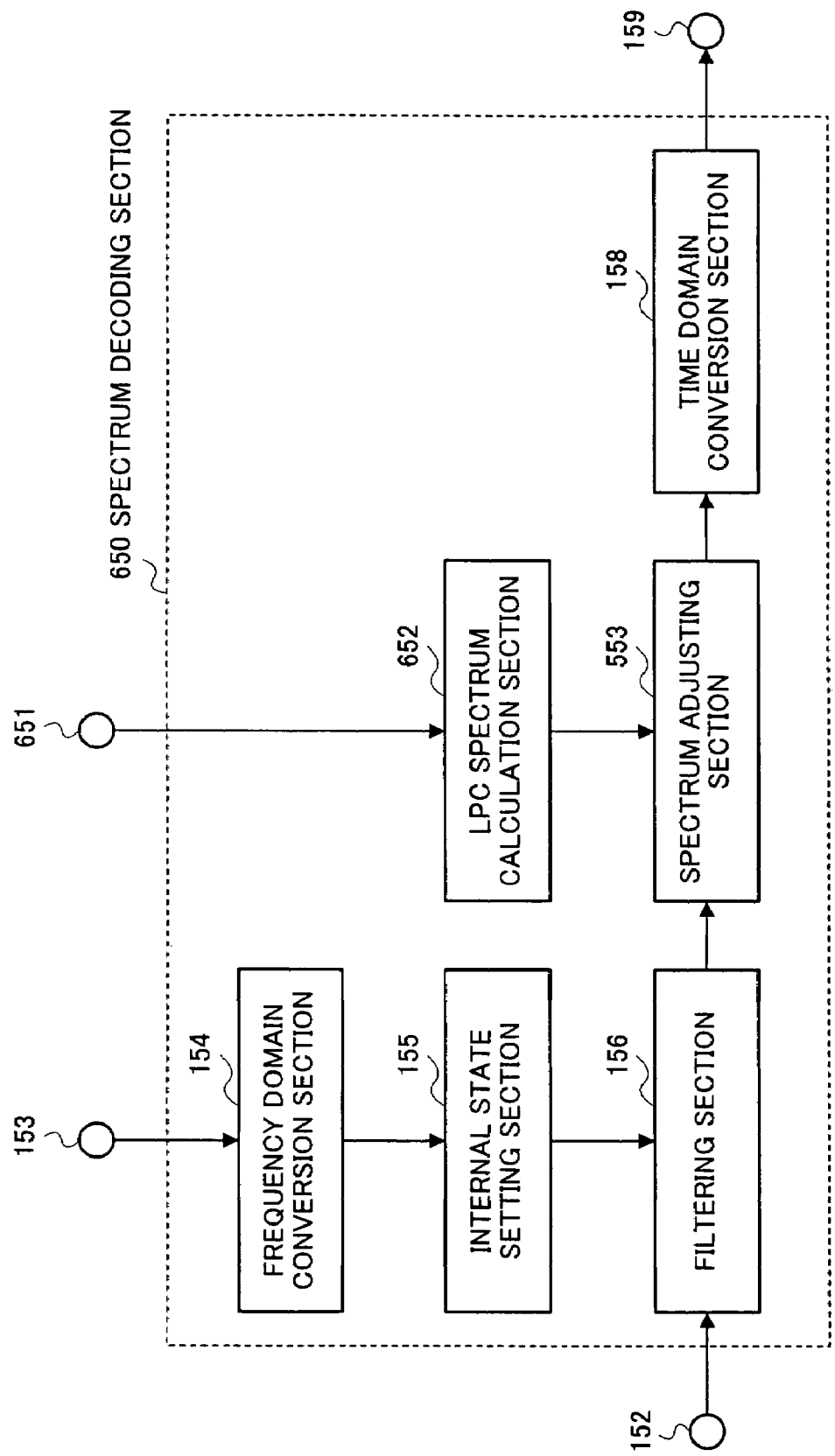
FIG. 19 is a block diagram showing the principal configuration of a spectrum decoding section according to Embodiment 5.

FIG. 19 is a block diagram showing the principal configuration of a spectrum decoding section 650 in a decoding apparatus according to Embodiment 5 of the present invention. This spectrum decoding section 650 has a basic configuration similar to that of spectrum decoding section 550 shown in FIG. 18, and therefore the same components are assigned the same reference numerals and explanations thereof will be omitted.

A feature of this embodiment is to further comprise LPC spectrum calculation section 652, use an LPC spectrum calculated with an LPC coefficient as spectrum envelope information, estimate a second spectrum, and then multiply the second spectrum by the LPC spectrum to obtain a more accurate estimated value of the second spectrum.

LPC spectrum calculation section 652 calculates LPC spectrum $env(k)$ from LPC coefficient $\alpha(j)$ input via input terminal 651 according to the following equation.

$$env(k) = \left| \frac{1}{1 - \sum_{j=1}^{NP} \alpha(j) e^{-j\frac{2\pi jk}{FH}}} \right| \quad \text{(Equation 10)}$$

Here, NP denotes the order of the LPC coefficient. Furthermore, it is also possible to calculate LPC spectrum $env(k)$ using variable $\gamma(0<\gamma<1)$ and changing the characteristic of the LPC spectrum.

In this case, LPC spectrum $env(k)$ is expressed by the following equation.

$$env(k) = \left| \frac{1}{1 - \sum_{j=1}^{NP} \alpha(j) \cdot \gamma^j \cdot e^{-j\frac{2\pi jk}{FH}}} \right| \quad \text{(Equation 11)}$$

Here, $\gamma$ may be defined as a fixed value or may also take a value which is variable from one frame to another. LPC spectrum $env(k)$ calculated in this way is output to spectrum adjusting section 553.

Spectrum adjusting section 553 multiplies decoded spectrum $S'(k)$ obtained from filtering section 156 by LPC spectrum $env(k)$ obtained from LPC spectrum calculation section 652 according to the following equation, $$S3(k)=S'(k)\cdot env(k) (FL \leq k < FH) \quad \text{(Equation 12)}$$

adjusts the spectrum in frequency band $FL \leq k < FH$ of decoded spectrum $S'(k)$ and generates adjusted decoded spectrum $S3(k)$. This adjusted decoded spectrum $S3(k)$ is provided to time domain conversion section 158 and converted to a time domain signal.

Thus, according to this embodiment, using an LPC spectrum as spectrum envelope information makes it possible to obtain a more accurate estimated value of the second spectrum.

The coding apparatus or decoding apparatus according to the present invention can be mounted on a communication terminal apparatus and base station apparatus in a mobile communication system, and therefore, it is possible to provide a communication terminal apparatus and base station apparatus having operations and effects similar to those described above.

The case where the present invention is constructed by hardware has been explained as an example so far, but the present invention can also be implemented by software.

The present application is based on Japanese Patent Application No. 2003-323658 filed on Sep. 16, 2003, entire content of which is expressly incorporated by reference herein.

INDUSTRIAL APPLICABILITY

The coding apparatus and decoding apparatus according to the present invention have the effect of performing coding at a low bit rate and is also applicable to a radio communication system or the like.

The invention claimed is:

1. A spectrum coding apparatus that encodes a spectrum including a first band and a second band, the spectrum coding apparatus comprising:
   a generation section that calculates an estimated spectrum of the second band using pitch information on a harmonic structure of the first band spectrum having at least a bandwidth of the second band;
   an acquisition section that determines the pitch information on the harmonic structure of the first band spectrum that minimizes a distortion measure between the estimated spectrum of the second band and the spectrum of the second band; and
   a coding section that encodes the determined pitch information on the harmonic structure of the first band spectrum that minimizes the distortion measure, instead of the spectrum of said second band.

2. The spectrum coding apparatus according to claim 1, wherein the acquisition section acquires information about the spectrum of the first band being shape information about a spectrum similar to the spectrum of the second band.

3. The spectrum coding apparatus according to claim 1, wherein the acquisition section acquires a filter parameter related to the estimated spectrum of the second band as information about the spectrum of the first band.

4. The coding apparatus according to claim 1, wherein:
   the first band is a low frequency band lower than a predetermined threshold;
   the second band is a high frequency band equal to or higher than the predetermined threshold;
   the generation section generates an estimated spectrum of the high frequency band using a filter comprising a spectrum of the low frequency band as an internal state;
   the acquisition section acquires a filter parameter that minimizes the distortion measure between an estimated spectrum of the high frequency band and a spectrum of the high frequency band; and
   the coding section encodes the filter parameter that minimizes the distortion measure, instead of the spectrum of the high frequency band.

5. The coding apparatus according to claim 4, wherein the generation section generates the estimated spectrum of the high frequency band using the filter comprising the spectrum of the low frequency band separated by an integer multiple of a pitch of the harmonic structure from the spectrum of the high frequency band as the internal state.

6. The coding apparatus according to claim 5, wherein the filter parameter is a filter coefficient.

7. The coding apparatus according to claim 4, wherein the coding section also encodes envelope information about the spectrum of the high frequency band.

8. The coding apparatus according to claim 4, wherein the coding section also encodes information about a power ratio between the spectrum of the low frequency band and the spectrum of the high frequency band.

9. The coding apparatus according to claim 4, wherein a filter fimetion of the filter is expressed by an equation as follows and the generation section generates the estimated spectrum using a zero input response of the filter:

$$P(z) = \frac{1}{1 - \sum_{i=-M}^{M} \beta_i z^{-T+i}}$$

where
P(z): Filter function
z: z conversion variable
2M+1: Order of filter
β: Weighting factor
T: Pitch coefficient.

10. The coding apparatus according to claim 9, wherein M=0 and β0=1 in the filter function.

11. The coding apparatus according to claim 4, wherein the spectrum of the low frequency band is obtained from a signal decoded after being coded in a lower layer in hierarchical coding.

12. The coding apparatus according to claim 4, wherein:
the generation section calculates an estimated value of the high frequency band using one of a plurality of parameter candidates prepared in advance,
the acquisition section calculates a distortion measure between the spectrum of the high frequency band and the estimated value, selects a parameter candidate that minimizes the distortion measure, and acquires information that specifies the selected parameter candidate as the filter parameter.

13. The coding apparatus according to claim 4, wherein:
the generation section performs filtering using one of a plurality of pitch coefficient candidates prepared in advance, calculates an estimated value of the spectrum of the high frequency band,
the acquisition section calculates a distortion measure between the spectrum of the high frequency band and the estimated value, selects a pitch coefficient candidate that minimizes the distortion measure, and acquires information that specifies the selected pitch coefficient candidate as the filter parameter.

14. A communication terminal apparatus comprising the coding apparatus according to claim 4.

15. A scalable coding apparatus that encodes a voice signal or audio signal separated into a low frequency band and high frequency band, the scalable coding apparatus comprising:
a first coding section that encodes a low frequency band signal of the voice signal or the audio signal; and
a second coding section that encodes a high frequency band signal of the voice signal or the audio signal using the low frequency band signal, wherein:
the second coding section comprises:
a first spectrum generation section that performs frequency domain conversion on the low-frequency band signal and generates a spectrum of the low frequency band;
a second spectrum generation section that performs frequency domain conversion on the voice signal or the audio signal and generates a spectrum having the low frequency band and high frequency band;
the coding apparatus according to claim 4, and
the acquisition section in the coding apparatus of claim 4 acquires the spectra generated by the first and second spectrum generation sections.

16. A communication terminal apparatus comprising the scalable coding apparatus according to claim 15.

17. A decoding apparatus comprising:
a spectrum acquisition section that acquires a spectrum of a low frequency band out of a spectrum having a low frequency band and a high frequency band;
a parameter acquisition section that acquires pitch information on a harmonic structure of the low frequency band spectrum that minimizes a distortion measure between an estimated spectrum of the high frequency band and the spectrum of the high frequency band, the estimated spectrum of the high frequency band being calculated at a corresponding encoding apparatus; and
a decoding section that decodes the spectrum of the low frequency band and the spectrum of the high frequency band using the spectrum of the low frequency band and the pitch information on the harmonic structure of the low frequency band spectrum.

18. The decoding apparatus according to claim 17, further comprising:
an envelope information acquisition section that acquires envelope information about the spectrum of the high frequency band,
wherein the decoding section performs the decoding using also the envelope information.

19. The decoding apparatus according to claim 17, wherein:
the decoding section comprises an estimation section that estimates the spectrum of the high frequency band using a filter comprising the spectrum of the low frequency band as an internal state and the parameter as a filter characteristic,
a filter function of the filter is expressed by an equation as follows; and
the estimation section performs the estimation using a zero input response of the filter:

$$P(z) = \frac{1}{1 - \sum_{i=-M}^{M} \beta_i z^{-T+i}}$$

where
P(z): Filler function
z: z conversion variable
2M+1: Order of filter
β: Weighting factor
T: Pitch coefficient.

20. The decoding apparatus according to claim 19, wherein M=0 and β0=1 in the filter function.

21. The decoding apparatus according to claim 17, wherein the spectrum of the low frequency band is generated from a signal decoded in a lower layer in hierarchical coding.

22. The decoding apparatus according to claim 17, wherein:

the decoding section comprises an estimation section that estimates the spectrum of the high frequency band using a filter comprising the spectrum of the low frequency band as an internal state and the parameter as a filter characteristic;

the parameter comprises a pitch coefficient; and the estimation section performs filtering using the pitch coefficient and calculates an estimated value of the spectrum of the high frequency band.

23. A communication terminal apparatus comprising the decoding apparatus according to claim 17.

24. A coding method for encoding a spectrum including a first band and a second band, the coding method comprising the steps of:

calculating, by a calculation device, an estimated spectrum of the second band using pitch information on a harmonic structure of the first band spectrum having at least a bandwidth of the second band;

determining the pitch information on the harmonic structure of the first band spectrum that minimizes a distortion measure between the estimated spectrum of the second band and the spectrum of the second band; and encoding the determined pitch information on the harmonic structure of the first band spectrum that minimizes the distortion measure, instead of the spectrum of the second band.

25. A decoding method comprising the steps of:

acquiring a spectrum of a low frequency band out of a spectrum having a low frequency band and a high frequency band;

acquiring pitch information on a harmonic structure of the low frequency band spectrum that minimizes a distortion measure between an estimated spectrum of the high frequency band and the spectrum of the high frequency band, the estimated spectrum of the high frequency band being calculated at a corresponding encoding apparatus; and decoding, by a decoder, the spectrum of the low frequency band and the spectrum of the high frequency band using the spectrum of the low frequency band and the pitch information on the harmonic structure of the low frequency band-spectrum.

* * * * *

UNITED STATES PATENT AND TRADEMARK OFFICE
CERTIFICATE OF CORRECTION

PATENT NO.           : 7,844,451 B2                                              Page 1 of 1
APPLICATION NO.      : 10/571761
DATED                : November 30, 2010
INVENTOR(S)          : Masahiro Oshikiri It is certified that error appears in the above-identified patent and that said Letters Patent is hereby corrected as shown below:

Claim 9, column 17, line 11 incorrectly reads:
"filter fimetion of the filter is expressed by an equation as"
and should read:
"filter function of the filter is expressed by an equation as"

Claim 19, column 18, line 58 incorrectly reads:
"P(z): Filler function"
and should read:
"P(z): Filter function"

Signed and Sealed this
Twenty-fourth Day of May, 2011

David J. Kappos
*Director of the United States Patent and Trademark Office*